United States Patent
Miura et al.

(10) Patent No.: US 9,081,480 B2
(45) Date of Patent: Jul. 14, 2015

(54) MULTIPLE MENUS FOR USE WITH A GRAPHICAL USER INTERFACE

(75) Inventors: Britt S. Miura, San Francisco, CA (US); Scott C. Morrison, Portland, OR (US)

(73) Assignee: AUTODESK, Inc., San Rafael, CA (US)

( * ) Notice: Subject to any disclaimer, the term of this patent is extended or adjusted under 35 U.S.C. 154(b) by 1789 days.

(21) Appl. No.: 11/773,207

(22) Filed: Jul. 3, 2007

(65) Prior Publication Data

US 2007/0250794 A1    Oct. 25, 2007

Related U.S. Application Data

(62) Division of application No. 09/908,182, filed on Jul. 17, 2001, now Pat. No. 7,246,329.

(60) Provisional application No. 60/293,109, filed on May 22, 2001, provisional application No. 60/291,947, filed on May 18, 2001.

(51) Int. Cl.
*G06F 3/0482* (2013.01)
*G06F 3/0481* (2013.01)

(52) U.S. Cl.
CPC ............ *G06F 3/0482* (2013.01); *G06F 3/0481* (2013.01)

(58) Field of Classification Search
CPC ...... G06F 3/048; G06F 3/0481; G06F 3/0482
USPC .......................... 715/779, 777, 812, 843, 813
See application file for complete search history.

(56) References Cited

U.S. PATENT DOCUMENTS

| 5,276,795 | A | * | 1/1994 | Hoeber et al. ................. 715/813 |
| 5,283,560 | A | | 2/1994 | Bartlett |
| 5,596,699 | A | | 1/1997 | Driskell |
| 5,689,667 | A | | 11/1997 | Kurtenbach |
| 5,701,424 | A | | 12/1997 | Atkinson |
| 5,721,853 | A | | 2/1998 | Smith |
| 5,726,688 | A | * | 3/1998 | Siefert et al. .................. 715/821 |
| 5,790,820 | A | | 8/1998 | Vayda et al. |
| 5,828,376 | A | * | 10/1998 | Solimene et al. ............. 715/821 |
| 5,838,321 | A | | 11/1998 | Wolf |
| 5,926,178 | A | | 7/1999 | Kurtenbach |

(Continued)

OTHER PUBLICATIONS

Tissavary, John "alias|wavefront's maya," Visual Magic Magazine, Oct. 10, 2001, http://visualmagic.awn.com/mag/june98/maya.html, (pp. 1-6).

(Continued)

*Primary Examiner* — Nicholas Augustine
(74) *Attorney, Agent, or Firm* — Artegis Law Group, LLP

(57) ABSTRACT

An approach for using multiple menus with a graphical user interface is disclosed. A multiple menu comprises a menu panel with two or more selection regions, each of which is associated with a base menu. A user requests the menu panel without selecting a menu object displayed on a display unit, such as by right-clicking. The menu panel is displayed along with one base menu, and other base menus are displayed by the user moving the cursor to another selection region. The user selects a menu item from a base menu to cause the application to execute the function associated with the menu item. The selection regions of the menu panel do not include information describing the content of the associated base menus. By arranging the base menus around the menu panel, cursor movement is minimized to improve user efficiency in using the application.

21 Claims, 14 Drawing Sheets

(56) References Cited

U.S. PATENT DOCUMENTS

| | | | |
|---|---|---|---|
| 6,133,915 | A * | 10/2000 | Arcuri et al. .............. 715/779 |
| 6,177,941 | B1 * | 1/2001 | Haynes et al. ............. 715/810 |
| 6,239,803 | B1 | 5/2001 | Driskell |
| 6,295,514 | B1 | 9/2001 | Agrafiotis et al. |
| 6,414,700 | B1 | 7/2002 | Kurtenbach et al. |
| 6,438,523 | B1 | 8/2002 | Oberteuffer et al. |
| 6,448,987 | B1 | 9/2002 | Easty et al. |
| 6,456,304 | B1 * | 9/2002 | Angiulo et al. ............ 715/779 |
| 6,549,219 | B2 | 4/2003 | Selker |
| 6,583,797 | B1 | 6/2003 | Roth |
| 6,618,063 | B1 | 9/2003 | Kurtenbach |
| 6,915,492 | B2 | 7/2005 | Kurtenbach et al. |
| 7,412,660 | B2 * | 8/2008 | Donalson .................. 715/777 |

OTHER PUBLICATIONS

Kurtenbach, et al. "The Hotbox: Efficient Access to a Large Number of Menu-items," CHI 99 May 15-20, 1999, (pp. 231-237), Proceedings of the ACM Conference on Human Factors in Computing Systems, New York.

Office Action, U.S. Appl. No. 11/773,193, dated Sep. 14, 2009.

* cited by examiner

MULTIPLE MENUS FOR USE WITH A GRAPHICAL USER INTERFACE

CROSS-REFERENCE TO RELATED APPLICATIONS

This application is a divisional of U.S. patent application Ser. No. 09/908,182 filed on Jul. 17, 2001 now U.S. Pat. No. 7,246,329. The Ser. No. 09/908,182 application claims benefit of U.S. Provisional Patent Application Ser. No. 60/293,109, filed on May 22, 2001, titled "A MECHANISM FOR CONTENT AND DESIGN LAYOUT." The Ser. No. 09/908,182 application also claims benefit of U.S. Provisional Patent Application Ser. No. 60/291,947, filed on May 18, 2001, titled "CONTENT LAYOUT AND DESIGN MECHANISM." These applications are all hereby incorporated by reference for all purposes as if fully set forth herein.

FIELD OF THE INVENTION

The present invention relates to computer software, and more specifically, to multiple menus for use with a graphical user interface.

BACKGROUND OF THE INVENTION

Many computer applications include a large number of commands, features, controls, options, and other functions, which can make it difficult for users to locate a desired function. For example, a three dimensional (3D) graphics application that allows a user to perform modeling, animation, and rendering for creating visual effects, character animation, and game development may contain hundreds or even thousands of different functions. An example of such a 3D application is 3d Studio Max® from Discreet®, a division of Autodesk, Inc.

Many applications use one or more types of menu objects for organizing the functions of the application. One approach for organizing application functions for more efficient use by users is the basic menu object that is part of the graphical user interface (GUI) for most modern applications. Typically, each application includes a menu bar at the top of the display that lists several different menus, such as File, Edit, View, Options, Window, and Help. A user selects one of the menus from the menu bar by using one of several methods. For example, the user may use a cursor control device, such as a mouse, to position the cursor over a desired menu and then click a button on the cursor control device to select the menu, or the user may use a "short cut" key or keys on the keyboard, such as "Alt-F" to select the File menu.

Once a menu is selected, a list of the menu items for the selected menu is displayed. The user may then select one of the menu items to execute the function associated with the menu item. Some menu items correspond to commands, such as to open or save a file. Other menu items correspond to dialog boxes that provide the user with options and perhaps also the status for a feature of the application. While menus generally accept one input from the user (e.g., the selection of a menu item to be executed), dialog boxes allow the user to provide multiple inputs, such as to configure options for the application. For example, the user of a dialog box can select or unselect options by using check boxes, using pull down menus to select from a list of options, and entering data into input boxes. When the user has configured the options as desired, the user typically exits the dialog box via an "OK" button or a "SAVE" button to apply the options as configured by the user, or the user may exit via a "CANCEL" button to disregard the options that the user may have modified.

Still other menu items in a menu correspond to sub-menus that present additional sets of menu items. As used herein, a sub-menu is a menu that is accessed from another menu or sub-menu. The term "base menu" is used herein to denote menus that are not sub-menus. For example, the File and Edit menus of a typical menu bar are base menus that may include menu items that lead to sub-menus. The term "menu" is used herein to denote both base menus and sub-menus.

While the basic menu approach helps to organize the functions that users may access for an application, the basic menu approach has several disadvantages. For example, to select a menu item using the cursor, the user must first move the cursor to a particular menu listed in the menu bar, select the menu, and then move the cursor to the desired menu item, which can often require a significant amount of cursor movement around the display. If the user is frequently accessing the functions of the application, the repeated movement of the cursor limits the productivity of the user.

Furthermore, extra cursor movement is part of the larger problem of the user's attention being divided between working with the GUI and working on the artwork or document that is the subject of the user's creative efforts. The repeated change of focus between the creative endeavor and navigating the user interface for commands limits the user's productivity and creative flow.

In addition, although shortcut keys can be used to avoid having to move the cursor, many users prefer to use the cursor instead of having to learn which short cut keys correspond to which menus or menu items. Applications with a large number of functions may require many different menus with one or more layers of sub-menus, and therefore the user may have to navigate through several menus to find a desired function.

Another approach for organizing the functions of an application is a menu object known as a tool bar. A tool bar is a list of short cuts to particular application features. The short cuts are often represented by small graphical images or icons. While the tool bar can provide quick access to several functions of the application, the number of features that may be included in the tool bar is limited because adding additional features to the tool bar occupies a greater amount of the display. Thus, larger tool bars leave less display area for displaying the other features of the application, such as a document in a word processor or a graphical image in a graphics application. Also, a toolbar generally exists at a fixed location on the display, resulting in significant cursor movement by the user. While a movable or floating tool bar, sometimes called a tool palette, may be used, the tool palette may need to be repeatedly moved around on the display to avoid blocking other features or content that are displayed by the application.

Yet another approach for organizing the functions of an application is a menu object known as a pop-up menu. The pop-up menu, sometimes referred to as "right-click" menu, is typically activated by the right button of a cursor control device, such as a mouse, trackball, joystick or touch pad. The pop-up menu helps to avoid excessive cursor movement because the menu is typically displayed at the location of the cursor and is activated by a button on the cursor control device. Pop-up menus may be context sensitive, meaning that the menu items displayed depend on the context when the menu is activated, such as which object is selected on the display.

Unfortunately, for applications with a large number of commands, the pop-up menu may be quite large and may not even fit on the display without running off of one or more edges of the display. Also, large pop-up menus require significant cursor movement by the user to select a desired menu item. In addition, large pop-up menus occupy a significant amount of the display, which obscures other features that are displayed by the application.

Still another approach for organizing the functions of an application is a menu object known as the "Marking Menu" by Alias|Wavefront. Marking Menus are pop-up menus that use a radial menu technique in which menu items are arranged in a circle around the cursor. Each menu item is selected by a quick stroke of the cursor by the user. Marking Menus may be used by displaying a radial menu. After the user has learned which menu items are located in each direction, Marking Menus may then be used by displaying an "ink trail" after the cursor without the radial menu. However, the number of menu items that can be accommodated in such a radial menu approach is limited because increasing the number of items means the user must be more accurate in selecting the direction that corresponds to a desired menu item. Further, each direction can only have one menu item, which further limits the number of menu items that may be included.

Another approach by Alias|Wavefront is a menu object known as the HotBox, which compiles all the menu items into one mega-menu bar that works like a pop-up menu. Menus are broken up into related sets, or menu bars. When the user presses and holds down the space bar, all the menu bars pop-up. While HotBox allows the user to access menu bars at the location of the cursor instead of at a fixed position on the screen, the user is still required to select the desired menu and then navigate through the menus and sub-menus as with a basic menu bar. Moreover, if there is a large number of menu bars and menus, HotBox can occupy a significant amount of the display.

The problems of significant cursor movement, divided user attention between the GUI and the creative endeavor, and large menus of the prior approaches are particularly inconvenient in applications that include hundreds or thousands of commands. Due to the large number of functions, the cursor must be moved over most or all of the display to locate and select a desired menu item, the user interrupts their creative work to navigate the menus to find desired commands, and the large size of the menus may block a significant amount of the document or images displayed by the application.

Based on the foregoing, it is desirable to provide improved techniques for managing menus associated with a graphical user interface for computer software.

SUMMARY OF THE INVENTION

Techniques are provided for using multiple menus with a graphical user interface. According to one aspect, a method for managing menus associated with a graphical user interface is described. A menu panel is displayed, which includes multiple selection regions that are each associated with a base menu. The menu panel is displayed in response to a user request that is not associated with the user selecting any other menu objects that may be displayed. Base menus are displayed depending on which selection region the cursor is closest to, and some or all of the base menus may be displayed simultaneously.

According to another aspect of the invention, a method for allowing a user to select a particular menu item is described. A menu is displayed with one menu item highlighted. The user causes the highlighted menu item to be executed by selecting a graphical object, such as a selection region or a menu title, or issuing a command, such as by using a hotkey.

According to yet another aspect of the invention, a method for generating menus with a graphical user interface is described. A master menu is created that may include some or all of the available menu items, and data from a user is received that specifies a subset of the master menu set of menu items. When the menu is requested, the menu is displayed by filtering the master set of menu items based on the data from the user.

According to another aspect, an apparatus for accessing menus displayed on a display unit is described. The apparatus comprises a menu panel with four selection regions arranged in a rectangular pattern. Base menus are associated with each selection region and are displayed adjacent to the respective selection regions. Menu titles that are associated with each selection region may be displayed.

According to other aspects, additional methods, apparatuses, and computer-readable media that implement the approaches above are described.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

An approach for using multiple menus with a graphical user interface is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are illustrated in block diagram form in order to avoid unnecessarily obscuring the present invention.

Figure 1:
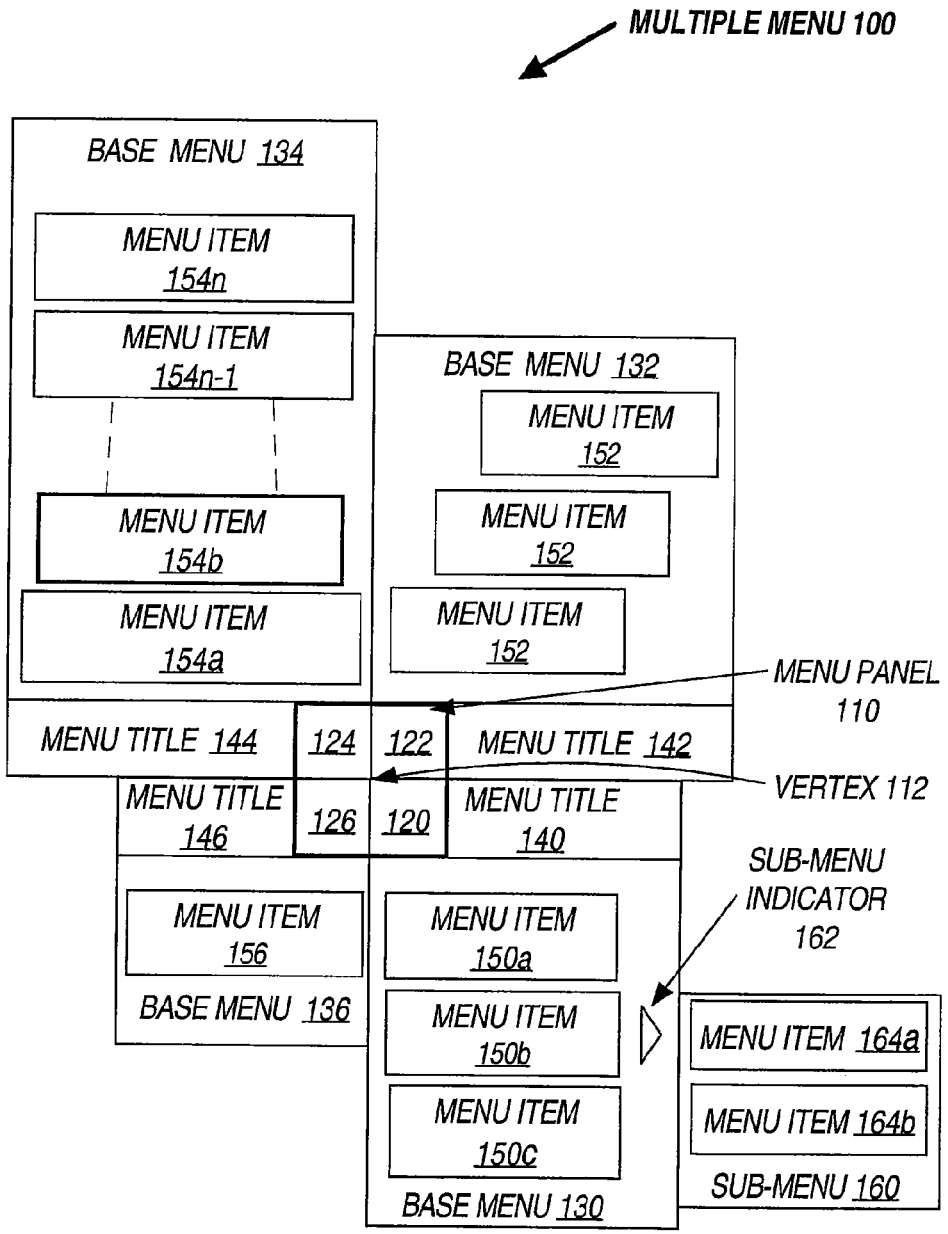
FIG. 1 is a block diagram that illustrates an example of a multiple menu, according to one embodiment of the invention.

In the following description, the various functions shall be discussed under topic headings that appear in the following order:

I. Structural and Functional Overview
  A. Organization of Multiple Menus
  B. Managing Multiple Menus
  C. Selecting a Particular Menu Item
  D. Generating Menus
II. Menu Panels
  A. Activation of Menu Panels
  B. Positioning of Menu Panels and Cursor
  C. Types of Menu Panels and Selection Regions
  D. Vertices of Menu Panels
  E. Menu Titles
III. Base Menu Operation
  A. Number of Base Menus Displayed
  B. Gesturing Base Menus
  C. Sub-Menus
IV. Base Menu Content
  A. Default Base Menus
  B. Context Sensitive Base Menus
V. Other Multiple Menu Features
VI. Selecting a Highlighted Menu Item
VII. Generating and Customizing Menus
VIII. Examples of Multiple Menus
IX. Hardware Overview I. Structural and Functional Overview A. Organization of Multiple Menus Multiple menus may be organized in a variety of shapes, sizes, and configurations, and have a variety of features. FIG. 1 is a block diagram that illustrates an example of a multiple menu, according to one embodiment of the invention. FIG. 1 depicts a multiple menu 100 that includes menu panel 110, base menus 130, 132, 134, 136, and menu titles 140, 142, 144, 146. Menu panel 110 includes a vertex 112 that is located at the center of menu panel 110 and selection regions 120, 122, 124, 126 that are each adjacent to vertex 112. Although the example of FIG. 1 includes four selection regions and associated features, other examples may include fewer or more selection regions, and the invention is not limited to a particular number of selection regions.

As used herein, the term "menu panel" means a graphical object displayed on a display unit that comprises two or more selection regions that are each associated with a base menu. The term "selection region" is used to represent a portion of a menu panel that is associated with a base menu and that can be selected to perform a particular function that is associated with the menu panel. For example, the user may use the selection regions to identify which base menu the user wants to have displayed by moving a cursor over or near the selection region that corresponds to the desired base menu. Additionally, the term "multiple menu" is used to describe a menu panel and the features and objects associated with the menu panel, such as the base menus and menu titles that are associated with the selection regions of the menu panel.

Menu panel 110 may be displayed on a display unit of a computer system at the request of a user of an application. For example, the user may request menu panel 110 by clicking the right button on a cursor control device or by pressing a particular key, sometimes referred to as a "hotkey," on the keyboard. As another example, menu panel 110 may be displayed on the display unit at the position of the cursor at the time the menu panel is activated, which can minimize the amount of cursor movement that is required by the user.

Selection regions 120, 122, 124, 126 may be blank or otherwise devoid of information that describes the base menus with which each selection region is associated.

Base menus 130, 132, 134, 136 are associated with selection regions 120, 122, 124, 126, respectively. Base menus 130, 132, 134, 136 each include one or more menu items, as discussed below, that are associated with functions of the application. The base menus may be organized by grouping related menu items together in one or more base menus. Some base menus may be context sensitive such that the base menus themselves, the menu items displayed on the base menus, or a combination thereof depend the object that is selected within the display, such as a particular graphical image, or the mode in which the application is operative, such as an edit mode or a scale mode.

According to one embodiment, all four base menus are displayed when the user initiates a request for menu panel 110. In general, the movement of the cursor by the user to select a particular menu item from among base menus 130, 132, 134, 136 is minimized since (1) menu panel 110 is located at the position of the cursor, and (2) the menu items displayed are grouped around menu panel 110, instead of being spread out in a long, single pop-up menu.

According to another embodiment, only one base menu is displayed at a time, and the base menu that is displayed is selected based on the cursor position and to which of selection regions 120, 122, 124, 126 the cursor is the closest. As a result, user cursor movement is minimized, and the amount of display area occupied by the menu is reduced because only one base menu is displayed at a time.

Menu titles 140, 142, 144, 146 are associated with selection regions 120, 122, 124, 126, respectively. Menu titles 140, 142, 144, 146 may contain descriptive text that relates to the content of the base menu that is associated with the same selection region as each menu title. For example, if a base menu relates to display functions, the menu title may be "Display."

Base menu 130 includes menu items 150a, 150b, 150c that correspond to functions of the application. Menu item 150b may be expanded to sub-menu 160 as indicated by sub-menu indicator 162. Sub-menu 160 includes menu items 164a, 164b. While menu panel 110 and base menus 130, 132, 134, 136 typically would no longer be displayed after a menu item is selected, the selection of a menu item corresponding to a sub-menu generally does not affect the display of menu panel 110, any base menus currently displayed, or the sub-menu that is displayed in addition to the previously displayed objects.

A user may select one of menu items 150a, 150b, 150c by a number of methods, including but not limited to, positioning a cursor on the display over a desired menu item and pressing a button on a cursor control device, pressing one or more keys on a keyboard that correspond to a short cut that is defined for the desired menu item, or a combination thereof.

Base menus 132, 136 are examples of "gesturing" menus that allow the user to select the menu item of each base menu by gesturing in the direction of the base menu by moving the cursor on the screen. In the example illustrated in FIG. 1, base menu 132 includes menu item 152, which is repeated three times. Base menu 136 includes menu item 156. For gesturing menus, the user is not required to press a key on a keyboard or a button on a cursor control device to select menu item 152 in base menu 132 or to select menu item 156 in base menu 136. Instead, to activate the function associated with a menu item in a gesturing menu, the user moves the cursor over the desired menu item, or over the base menu that includes the desired menu item.

Base menu 134 includes menu items 154a, 154b . . . 154n-1, 154n. While the number of menu items included in a base menu may both vary and be as large or as small as desired for a particular implementation, having from five to seven menu items in each base menu may provide a reasonable balance between having base menus that are too large, thereby requiring more cursor movement and display area, and too small, thereby requiring too many different menus.

Menu item 154b is a highlighted menu item. While menu item 154b is highlighted by the heavy border illustrated in FIG. 1, other methods of highlighting a menu item may be used, such as displaying the text, background, or a combination thereof for menu item 154b in a different color than the other menu items in base menu 134.

B. Managing Multiple Menus

Figure 2:
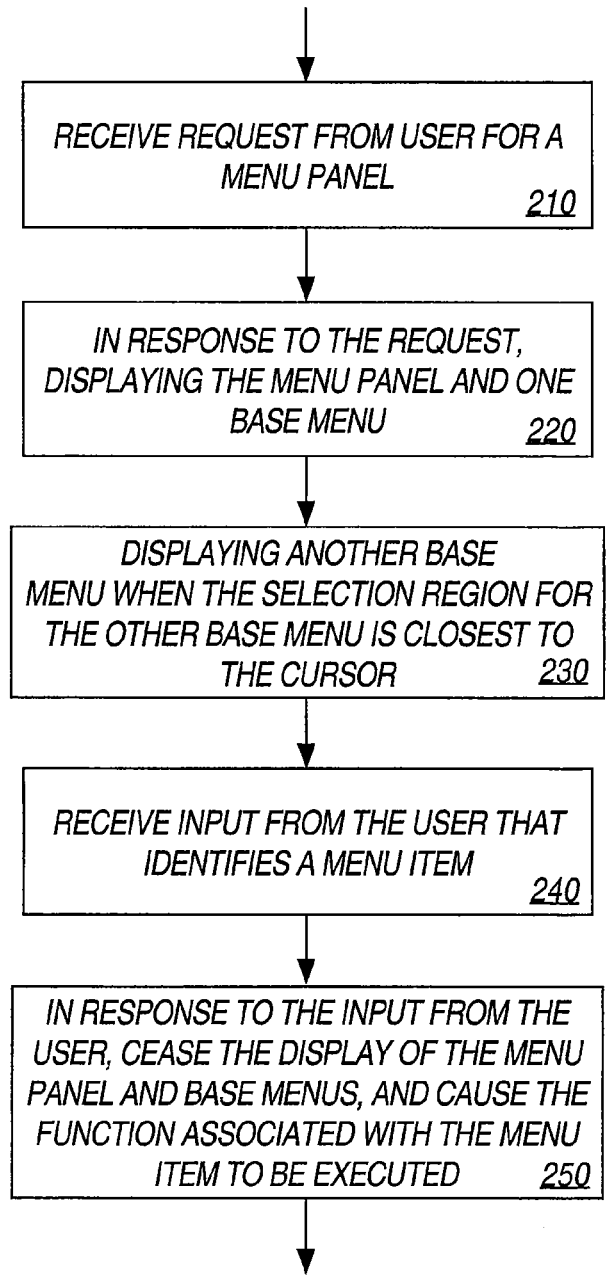
FIG. 2 is a logical flow diagram of a method for managing menus associated with a graphical user interface, according to one embodiment of the invention.

FIG. 2 is a logical flow diagram of a method for managing menus associated with a graphical user interface, according to one embodiment of the invention. Although FIG. 2 provides a particular set of steps in a particular order, other implementations may use more or fewer steps and a different order. For convenience, the method of FIG. 2 is described with reference to multiple menu 100 of FIG. 1, although the method of FIG. 2 may be used with other menus besides the particular example of multiple menu 100.

In block 210, a request from a user for a menu panel is received. For example, the request may be initiated in many ways defined for a particular application, including but not limited to, the user clicking on the right button of a cursor control device, pressing one or more keys on a keyboard, speaking a voice command, or a combination thereof.

In response to the request by the user, the menu panel and one base menu are displayed, as illustrated by block 220. For example, menu panel 110 and base menu 130 may be displayed in response to the request of the user. In contrast, in the example illustrated in FIG. 1, all of base menus 130, 132, 134, 136 that are associated with menu panel 110 are displayed.

In block 230, a different base menu is displayed when the cursor becomes closest to the selection region associated with another base menu. For example, in FIG. 1, assume that only menu panel 110 and base menu 130 are initially displayed. The user may move the cursor over selection region 122, thereby causing base menu 132 to be displayed and base menu 130 to no longer be displayed. In a similar fashion, the user may move the cursor on the display to cause base menu 134 or base menu 136 to be displayed. Generally, when a different base menu is displayed, the previously displayed base menu is no longer displayed, although that is not required in all implementations. In some implementations, previously displayed base menus may remain displayed as other base menus are displayed, or all base menus may be displayed in response to the request from the user for the menu panel. As another example, a previous base menu remains displayed for a specified amount of time after a new base menu is displayed.

In block 240, input from the user is received that identifies a menu item of the base menu currently being displayed. For example, if base menu 134 is displayed, the user may move the cursor over menu item 154a and click the left button of the cursor control device to select menu item 154a.

In block 250, in response to the input from the user that identifies the menu item, the menu panel and the base menus are no longer displayed and the function associated with the selected menu item is executed by the application. For example, if the menu item is associated with a particular mode of the application, the application switches to the particular mode as a result of the user selecting the menu item.

C. Selecting a Particular Menu Item

Figure 3:
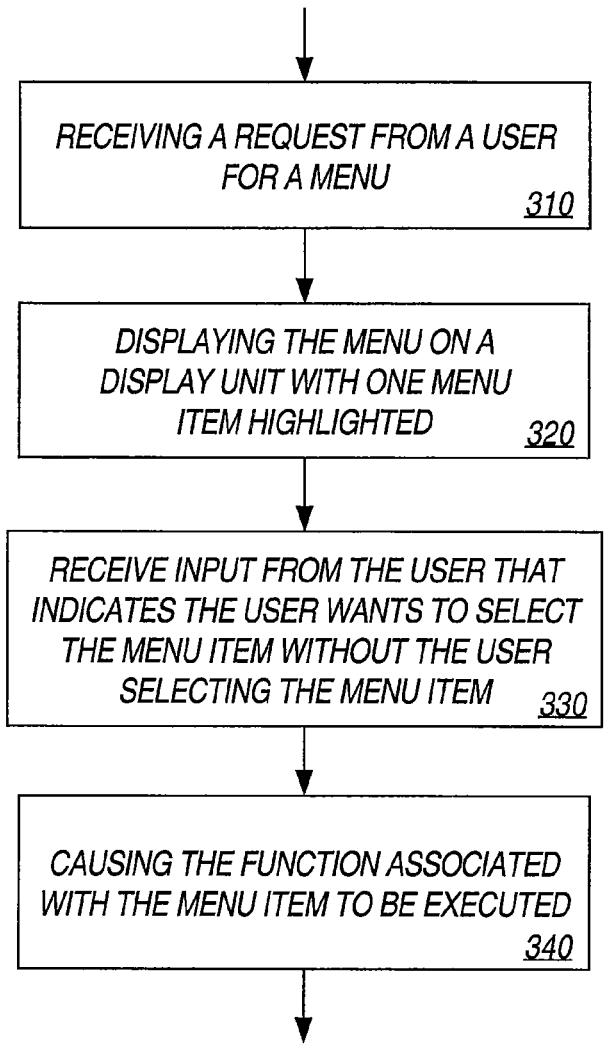
FIG. 3 is a logical flow diagram of a method for selecting a particular menu item, according to one embodiment of the invention.

FIG. 3 is a logical flow diagram of a method for selecting a particular menu item, according to one embodiment of the invention. Although FIG. 3 provides a specific set of steps that are performed in a particular order, other implementations may use more or fewer steps that may be performed in a different order. For convenience, the method of FIG. 3 is described with reference to multiple menu 100 of FIG. 1, although the method of FIG. 3 may be used with other menus besides the particular example of multiple menu 100, including non-multiple menus. In block 310, a request from a user for a menu is received. The menu requested by the user may be a base menu that is associated with a multiple menu, such as multiple menu 100 of FIG. 1, or the menu may be a sub-menu or any other type of menu, such as a menu accessed via a menu bar, tool bar, or a pop-up menu.

In block 320, the menu is displayed on a display unit with one menu item of the menu highlighted. For example, menu item 154b in FIG. 1 is highlighted by the dark border, although in practice any form of highlighting may be used, such as by displaying the text of the highlighted menu item in a different color or against a different colored background.

The menu item that is highlighted may be determined based on one of a variety of criteria. For example, the highlighted item may be the last menu item that was previously selected for the menu, a specified default menu item for the menu, or the most frequently used menu item for the menu.

In block 330, input is received from the user, which indicates that the user wants to select the highlighted item. Here the input is initiated without the user selecting the highlighted item. For example, in FIG. 1, if the user wishes to select menu item 154b that is highlighted, the user may select menu title 144, such as by positioning the cursor over menu title 144 and pressing the left button of a cursor control device, by positioning the cursor over selection region 124 and pressing a particular key or keys on a keyboard, or by similar ways of selecting a specified object other than by directly selecting the highlighted menu item on the display. By allowing the user to select menu item 154b by selecting either menu title 144 or selection region 124, the user need not take the time nor exercise the effort to move the cursor to menu item 154b to select the specific menu item, thereby improving the efficiency of using the application.

In block 340, the function associated with the highlighted menu item is caused to be executed by the application, just as if the highlighted menu item had been itself directly selected by the user via the cursor or another input device.

D. Generating Menus

Figure 4:
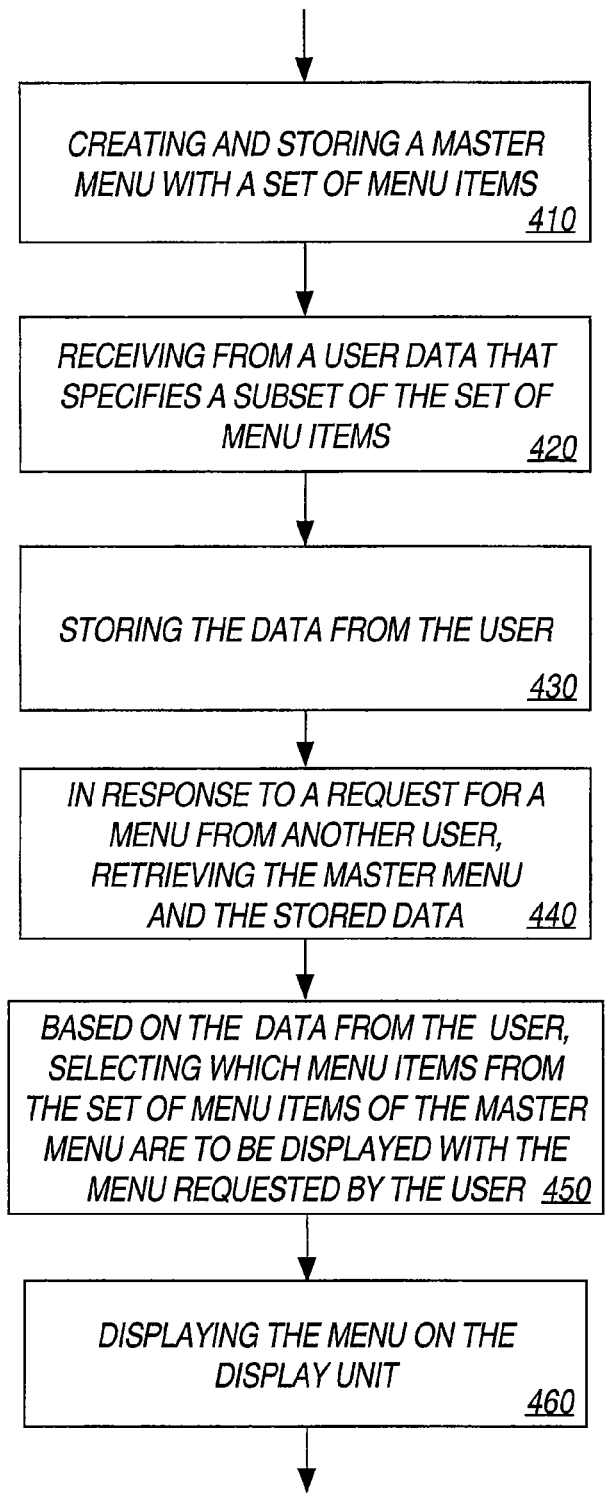
FIG. 4 is a logical flow diagram that depicts an example of a method for generating menus for display on a display unit, according to one embodiment of the invention.

A menu may be generated by taking a large set of menu items and applying a "filter" to identify specific menu items to include when the menu is displayed. FIG. 4 is a logical flow diagram that depicts an example of a method for generating menus for display on a display unit, according to one embodiment of the invention. Although FIG. 4 provides a particular set of steps that are performed in a specific order, other implementations may use more or fewer steps that may be performed in a different order. For convenience, the method of FIG. 4 is described with reference to multiple menu 100 of FIG. 1, although the method of FIG. 4 may be used with other menus besides multiple menu 100, including non-multiple menus.

In block 410, a master menu with a set of menu items is created and stored. The term "master menu" is used to describe a menu containing a set of menu items that are filtered prior to displaying the menu. A master menu may be referred to as an "original menu." For example, if a particular menu is an Edit menu, menu items relating to editing functions would be included in the Edit master menu. In certain implementations, the menu items included in the master menu may include many or all of the functions that are related to the particular type of menu. The master menu may be created by many entities, including but not limited to, the application, the developer of the application, and the user. The master menu may be stored in the form of data that identifies the set of menu items that are associated with the master menu.

In block 420, data is received from a user, which specifies a subset of the set of menu items included in the master menu. For example, the user may access a dialog box that allows the user to customize one or more menus. The dialog box presents the menu items in the set of menu items for the master menu, and the user may select which menu items are to be included and excluded when the particular menu is displayed. In certain implementations, the data received from the user may specify how the menu items are organized in a menu.

In block 430, the data from the user is stored. For example, the data may be a list of the items from the master menu that are to be included in the menu when displayed, a list of items from the master menu to be excluded, or some other indication of which items are to be displayed for the menu. As used herein, this data may be referred to as "filter data" because this data defines a "display filter," also referred to as a "visibility filter." The "display filter" is used as a filter for the set of menu items of the master menu to determine which menu items are to be displayed within the menu.

In block 440, the master menu and the filter data are retrieved in response to a request from a user for the particular menu. For example, the user may select the Edit menu from a menu bar or a menu panel by clicking on an Edit menu object in a menu bar or by selecting a selection region of the menu panel that is associated with the Edit master menu. In response to the selecting the Edit menu, the Edit menu from block 410 and the data stored in block 430 are retrieved.

In block 450, the data from the user that specifies the subset of menu items is used with the master menu to select the menu items of the set of the master menu that are to be displayed for the menu requested by the user. For example, if the display filter specified a subset of menu items to be included, only the menu items of the subset would be selected, or if the display filter specified a subset of menu items to be excluded, all of the menu items of the set of menu items for the master menu would be selected except for those included in the subset.

In block 460, the menu with the menu items selected from the master menu from block 450 is displayed on the display unit.

By providing display data that identifies which menu items of the master menu are to be displayed, the user can easily customize menus via a dialog box by selecting which menu items are to be included or excluded from a particular menu. In contrast, some prior approaches for customizing menus require that the user work with a scripting language to modify menus, which is a less convenient approach to customizing menus.

In addition, by creating and storing a master menu prior to receiving a request from the user for the menu, the menu does not need to be created each time the menu is requested. Instead, when the previously created master menu is displayed, a subset of the menu items included in the master menu is displayed by applying the display filter.

II. Menu Panels

Menu panels may be activated in a variety of ways, including but not limited to, cursor control devices, multiple key input devices, voice commands, or a combination thereof. Once activated, menu panels may be positioned based on the location of the cursor, and repositioned based on the menu panel's location relative to the edges of a display. Different types of menu panels and selection regions may be used. A menu panel may include a vertex and have the selection regions positioned adjacent to the vertex. Menu titles may be associated with the selection regions of the menu panels.

A. Activation of Menu Panels

Menu panels may be activated using a variety of methods and techniques. According to one embodiment, a user requests the display of a menu panel by using one or more controls on a cursor control device. For example, the user may press a button of a mouse, trackball or cursor pad. Other types of cursor control devices and controls may be used as well. As a more specific example, the application may be configured to interpret the pressing of the right button of a cursor control device as a request by the user for the display of a menu panel. The request by the user for the display of the menu panel may be described as "activating" the menu panel or as "triggering" the menu panel.

According to another embodiment, a user may request the display of a menu panel using one or more keys on a multi-key input device. For example, the user may press a specified key or key combination on a keyboard, such as pressing the "M" key simultaneously pressing "CTRL" key and the "E" key. The use of another input device besides the cursor control device to request a menu panel may be used to divide the work between a user's dominant and non-dominant hands. For example, for a right-hand dominant user, the right hand is typically used to manipulate the cursor control device, such as a trackball. The left hand may then be used to manipulate a second input device, such as a keyboard, to request the menu panel.

According to another embodiment, a user requests the display of a menu panel by using a combination of one or more controls on a cursor control device and one or more keys on another input device. For example, the user may press the "CTRL" key on a keyboard while pressing the right button on a mouse.

Different controls, keys, and other commands or combinations thereof may affect the menu panels, base menus, menu items, or a combination thereof that are displayed. For example, a user may press the "shift" key and the "E" key on a keyboard to request a menu panel that is associated with one or more edit menus. The efficiency of a user working with an application that has many functions can be improved by the user using one hand, such as the user's non-dominant hand, with an input device like a keyboard to request different menu panels based on different keys while using the user's dominant hand with cursor control device like a mouse to view different base menus and select a particular menu item.

Additional approaches for accessing menu panels may be used besides the embodiments and examples above. For example, the user may provide a voice command to a computer equipped with hardware and software to accept voice commands as input, or the user may use a touch screen.

Once a menu panel is requested, the user may send another request to cause the menu panel to no longer be displayed. For example, the menu panel may be configured to no longer be displayed after selection of a menu item. As another example, the user may issue a separate request to no longer display the menu panel by pressing a specified key on a multiple key input device, such as the "ESC" key, or by pressing a specified button on a cursor control device, such as the middle mouse button.

B. Positioning of Menu Panels and Cursor

According to one embodiment, a menu panel is positioned at the location of the cursor when the user requests the menu panel. For example, if the user requests the menu panel by right-clicking with a mouse, the menu panel may be displayed on the display unit with the center of the menu panel at the point of the cursor.

According to another embodiment, a menu panel is positioned as close as possible to the location of the cursor when the user requests the menu panel while allowing sufficient room for the base menus to be displayed without overlapping specified portions of the display or without running off of the edge of the display. For example, if the user requests the menu by using a hotkey and the cursor is at the left edge of the display, the menu panel is positioned to the right of the cursor position to leave sufficient room to display any base menus associated with the menu panel between the menu panel and the left edge of the display.

According to yet another embodiment, the menu panel is not repositioned when displayed, even if a base menu may not fit on the display. If the menu panel is not repositioned, several different approaches may be used when displaying a base menu. For example, only the portion of the base menu that can be displayed is displayed. As another example, base menus may be fully displayed but with the base menus overlapping to fit on the display. Additionally, a scroll function may be used to display the portion that does fit on the display and to allow the user to access the non-displayed menu items via the scrolling object. Scrolling may be automatic based on the position of the cursor (e.g., as the cursor approaches the edge of the base menu, the menu items displayed scroll) or responsive to a command from the user, such as clicking a button on a cursor control device.

In certain embodiments, the cursor mayor may not be repositioned when the base menu and/or menu panel are repositioned.

In general, the menu panel and base menus may be positioned anywhere on the display and repositioned as necessary to be viewable by the user and to avoid running off of the display or obscuring an underlying image.

According to one embodiment, when a menu panel is activated, the cursor is positioned at the center of the menu panel. For example, the menu panel may be positioned such that the center of the menu panel is at the point of the cursor, and therefore the cursor is not moved from where the cursor was located when the menu panel was requested. As another example, the menu panel may be positioned away from the position of the cursor so that the base menus can be displayed without overlapping or running off of the edge of the display. In this example, the cursor is repositioned at the center of the menu panel as displayed.

According to another embodiment, the cursor is positioned at a specified location associated with the menu panel. For example, the cursor may be located in the center of a specified selection region. If the multiple menu is configured to display one base menu at a time, depending on the cursor position, this approach may be used to specify which base menu is to be initially displayed with the menu panel. As another example, the cursor may be positioned at a specified location associated with a menu title or within a base menu.

As yet another example, the cursor may be positioned over a specified menu item of a specified base menu. The menu item may be the menu item that is highlighted for the menu, as discussed below. Alternatively, the menu item may be the menu item that is centrally located in the base menu, to minimize the cursor movement required to reach other menu items in the menu.

In general, the cursor may be located at any position on the multiple menu as determined from a reference point associated with the multiple menu. For example, the reference point may be the vertex of the menu panel, and the cursor's initial position may be determined in reference to the vertex so that the cursor is initially positioned at any location within the menu panel or the menu titles or base menus associated with the menu panel.

C. Types of Menu Panels and Selection Regions

According to one embodiment, a menu panel is in the form of a square that is comprised of four selection regions, each located in one quadrant of the square. For example, menu panel 110 and selection regions 120, 122, 124, 126 of FIG. 1 illustrate one implementation of this square approach for displaying menu panels and selection regions.

Figure 5:
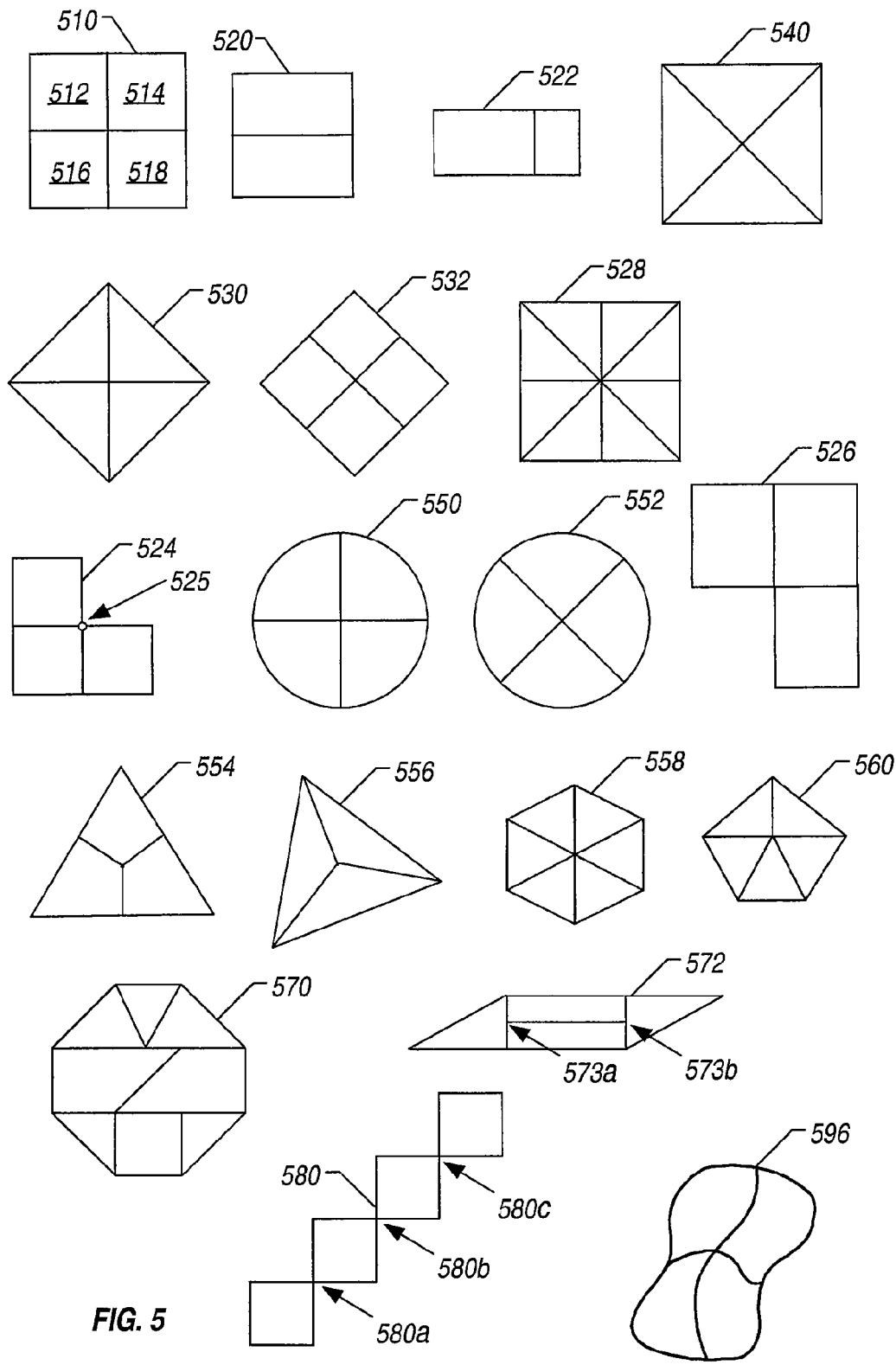
FIG. 5 is a block diagram illustrating several examples of menu panels.

According to other embodiments, a menu panel and the selection regions of which the menu panel is comprised may take a wide variety of forms, sizes, shapes and configurations. FIG. 5 is a block diagram illustrating several examples of menu panels. However, implementations of menu panels are not limited to the examples described herein and illustrated in FIG. 5. In particular, a menu panel may have fewer or more selection regions of the same or different sizes, in different orientations or configurations, and the menu panel itself may have a variety of shapes, sizes and orientations.

FIG. 5 depicts a menu panel 510 that is similar to that of menu panel 110 in that menu panel 510 is a box comprised of square-shaped selection regions 512, 514, 516, 518. However, menu panels may have fewer selection regions. For example, menu panel 520 has two selection regions oriented vertically, menu panel 522 has two selection regions of different sizes oriented horizontally, menu panel 524 has three selection regions organized into an "L" shape, and menu panel 526 has three larger selection regions organized into a rotated "L" shape. Menu panels may have more selection regions, such as those depicted in menu panel 528 that includes eight selection regions.

Menu panels may also have different orientations. For example, menu panel 530 has a rotated square shape with the selection regions defined by a horizontal line and a vertical line, and menu panel 532 has a rotated square shape with the selection regions defined by two diagonally oriented lines between the centers of the sides of menu panel 532.

In addition, menu panels may have different orientations of the selection regions, such as depicted in menu panel 540 that illustrates a larger square-shaped selection panel with the selection regions defined by diagonal lines between the corners of menu panel 540.

In addition, menu panels may have different shapes with various orientations, number of selection regions, and configurations of selection regions. For example, menu panel 550 has a circular shape with horizontal and vertical lines defining the selection regions. Menu panel 552 also has a circular, yet smaller, shape with the selection regions defined by diagonal lines. Menu panel 554 has a triangular shape with the selection regions defined by lines between the triangle's center and the center of the triangle's sides. Menu panel 556 has a larger but rotated triangular shape with selection regions defined by lines between the corners of the triangle and the center of the triangle. Menu panel 558 has a hexagon shape and six triangular selection regions.

Menu panels need not be symmetrical. For example, menu panel 560 has a pentagonal shape, and menu panel 522 has two selection regions of differing sizes. The selection regions need not have the same shape or orientation. For example, menu panel 570 has an octagonal shape and several types of selection regions, and menu panel 572 has triangular and rectangular selection regions within a trapezoidal shape.

Furthermore, menu panels can have any type of shape, orientation, configuration, or size, depending on the implementation. For example, menu panel 580 depicts a menu panel comprised of four square selection regions arranged in a diagonally oriented stair-like manner. And menu panels and selection regions are not limited to common geometric shapes, such as illustrated by the amoeba-shaped menu panel 596.

The base menu associated with each selection region of a particular menu panel is typically displayed adjacent to the selection region, although in a particular implementation, each base menu may be located at any position on the display unit.

According to one embodiment, a menu panel may be void of information that describes the content or functions of the base menus associated with each selection region of the menu panel. For example, the menu panel and selection regions may be blank, meaning that there is no text, graphics, or other content displayed, although the menu panel may have one or more colors or patterns. In contrast, other menu objects, such as menu bars and tool bars, include descriptive text or graphics that help the user to identify the content of the menus or the function of the menu objects.

According to another embodiment, a particular selection panel that corresponds to a base menu that is currently displayed is highlighted to differentiate the particular selection panel from the other selection panels. For example, the particular selection panel may be indicated by a different color when the base menu that is associated with the particular selection panel is displayed.

D. Vertices of Menu Panels

According to one embodiment, a menu panel includes a vertex that is adjacent to each of the selection regions of the menu panel. For example, in FIG. 1, vertex 112 is located at the center of menu panel 110 and selection regions 120, 122, 124, 126 are each adjacent to vertex 112. If the application is configured to position the vertex at the point of the cursor and to display the base menu that is associated with the selection region that is closest to the cursor, the user need only make small cursor movements to display each base menu.

The vertex is not limited to a point that is centered in the middle of the menu panel. According to other embodiments, the vertex may be located away from the center of the menu panel. For example, menu panel 524 includes a vertex 525 that is not centered in menu panel 524, yet it is adjacent to three selection regions as illustrated.

According to other embodiments, a menu panel includes more than one vertex that are each adjacent to two or more selection regions. For example, menu panel 572 includes vertices 573a, 573b that are each adjacent to three selection regions. As another example, menu panel 580 includes vertices 580a, 580b, 580c that are each adjacent to two selection regions. The application may be configured to locate the menu panel such that one vertex is positioned at the cursor position, or the application may be configured to position the menu panel so that the cursor is located based on all the vertices, such as at a point equidistant from each vertex.

E. Menu Titles

According to one embodiment, a menu title is associated with one or more selection regions of a menu panel. For example, in FIG. 1, menu titles 140, 142, 144, 146 are associated with selection regions 120, 122, 124, 126, respectively. A menu title may include descriptive text, symbols, graphical images, or a combination thereof, that is related to the content or function of the base menu corresponding to the particular selection region. Such descriptive information may be used to aid the user in determining which base menu has the menu item that the user wants to select.

The menu title may be displayed when the base menu with which the menu title is associated is also displayed. Alternatively, the menu title may be displayed when the cursor is closest to the selection region to which the menu title is associated. As yet another alternative, the menu title may be displayed whenever the menu panel is displayed, regardless of whether the associated base menu is displayed.

The menu title may be displayed adjacent to the corresponding selection region, adjacent to the corresponding base menu, at an intermediate position relative to the corresponding base menu and selection region, or at any position on the display.

The menu title may serve other purposes besides acting as an aid to the user to identify and describe base menus. For example, as discussed below, the menu title may be used to allow the user to select a highlighted menu item from the associated base menu, thereby allowing the user to quickly select the highlighted item without having to move the cursor to the highlighted item.

III. Base Menu Operation

A. Number of Base Menus Displayed

According to one embodiment, each base menu that is associated with a selection region of the menu panel is displayed when the menu panel is displayed. For example, when the user requests menu panel 110 of FIG. 1, base menus 130, 132, 134, 136 are displayed at the same time as menu panel 110 is displayed, and after the user has selected a menu item from a particular base menu, menu panel 110 and base menus 130, 132, 134, 136 are no longer displayed.

According to another embodiment, only one base menu is displayed at a time, depending on which selection region the cursor is closest to. For example, in FIG. 1, if the cursor is positioned on top of or adjacent to selection region 124, only base menu 134 is displayed. If the user moves the cursor so that it is on top of or closest to selection region 126, only base menu 136 is displayed. The display of only one base menu at a time minimizes the amount of display area covered by the menu, and yet the user can easily see other base menus by making small movements of the cursor on and around menu panel 110.

According to yet another embodiment, one base menu is specified to be displayed when a menu panel is displayed. For example, if the multiple menu is configured to only display one base menu at a time and the menu panel is positioned at the point of the cursor, a particular base menu may be designated to be displayed initially when the menu panel is first displayed. As another example, if the multiple menu is configured to display one base menu at a time, a particular selection region may be specified and the menu panel positioned such that the cursor is initially over the specified selection region, thereby causing the associated base menu to be initially displayed when the menu panel is initially displayed.

According to other embodiments, more than one but less than all of the base menus may be displayed at a time or no base menus may be displayed until the user moves the cursor from the vertex towards a particular selection menu.

B. Gesturing Base Menus

According to one embodiment, at least one base menu associated with a menu panel is a gesturing base menu such that the menu item associated with the gesturing base menu may be selected by the user gesturing with the cursor. For example, in FIG. 1, base menus 132, 136 are gesturing menus. The user may select menu item 156 of base menu 136 by moving the cursor from menu panel 110 towards base menu 136, or by moving the cursor over base menu 136. As another example, the user may use a click and drag approach in which the user holds down a particular key on an input device or a particular button on a cursor control device while moving the cursor and then indicates a particular menu item is to be selected by releasing the particular key or the particular button.

Gesturing menus may include one menu item, such as base menu 136, or multiple copies of a menu item, such as base menu 132 that includes three copies of menu item 152. If a base menu includes more than one copy of a menu item, the multiple copies may be arranged to be consistent with the direction of cursor movement when the user moves the cursor from the menu panel to the base menu, such as illustrated by the diagonal arrangement of the multiple copies of menu item 152 in base menu 132.

Gesturing menus may be oriented in a variety of ways and may comprise from none to all of the base menus for a particular multiple menu. For example, FIG. 1 depicts base menus 132, 136 that are located at the upper right and lower left corners, respectively, of square-shaped menu panel 110. However, a different implementation of a square-shaped menu panel may include from zero to four gesturing menus.

Such square-shaped menu panels provide for familiar menu orientations and locations, although a gesture to select the menu item for a base menu is generally required to be in a diagonal direction. However, other implementations may use gesturing menus that are horizontally and vertically oriented such that the gestures by the user are up and down and left and right. Some users may find the horizontal and vertical gestures more natural than the diagonal gestures, even though with the horizontal and vertical gestures, the display of base menus with more than one menu item would likely be in a modified form to conform to the orientation of the selection regions of such menu panels. For example, menu panels 532, 540, 552 are examples of menu panels in which the gesturing menus, if used, are generally oriented up and down and right and left. If base menus having different menu items are included with the gesturing menus of such menu panels, the base menus may be located or repositioned to avoid overlap in the display of the base menus in case the base menus are displayed at the same time.

A menu title may be displayed with a gesturing base menu. The title bar may contain descriptive text, symbols, graphical images or a combination thereof. However, in a typical implementation of gesturing menus, the menu title is the same as the menu item displayed in the gesturing menu. As another alternative, the menu title for a gesturing menu may include a symbol or symbols that are associated with gesturing menus to identify it as such. For example, the menu title may consist of a series of arrows, such as ">>>" or "<<<" that may be generally oriented in a direction corresponding to the direction that the cursor would be moved to select the menu item for the gesturing menu.

C. Sub-Menus

According to one embodiment, a base menu may include one or more menu items that correspond to a sub-menu. For example, in FIG. 1, menu item 150b is associated with sub-menu 160. A menu item that is associated with a sub-menu may be identified as such by using a sub-menu indicator, such as sub-menu indicator 162.

The sub-menu is typically displayed adjacent to the menu item that is associated with the sub-menu as well as adjacent to the base menu or a previous sub-menu that contains that menu item. The sub-menu may be displayed whenever the cursor is positioned over the associated menu item or when the user selects the associated menu item, such as by clicking on the associated menu item or sub-menu indicator with a mouse. Generally, the sub-menu is displayed concurrently with the associated base menu or previous sub-menu from which the sub-menu is activated, and when a menu item from a sub-menu is selected, the sub-menu, menu panel, and any displayed base menus are no longer displayed, and the application executes the function associated with the selected menu item.

Whether or not sub-menus are incorporated into a multiple menu depends on the particular application, or for a given application, on the particular implementation. For example, a company installing an application for its employees may configure the application to not use sub-menus to avoid cluttering of the display. If the elimination of sub-menus results in base menus that are judged to be too large, additional multiple menus may be configured and activated by different commands, such as different hotkeys or buttons on a cursor positioning device.

IV. Base Menu Content

A. Default Base Menus

According to one embodiment, at least one default base menu is associated with a menu panel. For example, a default base menu may include menu items for functions that are common to all aspects of the application. Therefore, the users may want to have such functions always accessible from a multiple menu. As a specific example, a default base menu may include menu items that allow the user to select a particular mode from a set of modes for the application, such as an edit mode, scale mode, and move mode.

The content of a set of base menus that are associated with a menu panel may follow a standard approach although each implementation may be configured to suit the needs of a user or group of users. For example, with a square-shaped menu panel, such as menu panel 110, the lower right and upper right base menus may include a particular set of functions while the left side base menus are context-sensitive. As a specific example, if the application is a 3D graphics application, the lower right base menu may include transformation tools, the upper right base menu may include display tools, the lower left base menu may be a context-sensitive base menu that depends on the object selected, and the upper left base menu may be another context-sensitive base menu that depends on the mode in which the application is operating in, such as an edit mode.

B. Context Sensitive Base Menus

According to another embodiment, at least one base menu associated with a menu panel is context sensitive such that the base menu, the menu item or items of the base menu, or a combination thereof, depend on the context when the menu panel is requested by the user. For example, the application may display two or more objects that are each of a different type. Depending on which of the objects is selected, such as by left clicking on a particular object, a different base menu or set of base menus may be included in a multiple menu when the user requests the menu panel. As another example, the content of one or more base menus depends on which object is closest to the cursor when the menu panel is requested.

The contents of a base menu may depend on other criteria besides which object is selected or which object is closest to the cursor when the menu panel is requested. For example, the base menu contents may depend on the mode in which the application is in at the time the menu panel is requested, so that if the application is in an edit mode for example, a base menu containing edit menu items is included. As another example, the base menu contents may depend on which feature or function of the application is currently selected or being used.

V. Other Multiple Menu Features

In addition to the functions and features described above for multiple menus, other features may be incorporated into a particular implementation. According to one embodiment, each of the base menus associated with a menu panel has the same width. Having the same width provides for a consistent appearance, and the selected width that is used may be chosen to limit the amount of display area occupied by the base menus. According to another embodiment, the base menus associated with a menu panel do not have the same width. As a result, the base menus may vary in width as in the example illustrated in FIG. 1. The width of each base menu width may be determined by an appropriate criteria, such as the widest menu item for the base menu.

According to yet another embodiment, each of the base menus associated with a menu panel has the same height. According to another embodiment, the base menus associated with a menu panel do not have the same height. As with the fixed width, a fixed height minimizes the cursor movement needed and the display area occupied by the base menus. For example, the height of each base menu may be determined by the number of menu items. Even though the heights of the base menus may vary, a particular application or implementation of an application may conform to a general guideline regarding menu height, such as that each base menu have five to seven menu items.

Figure 6:
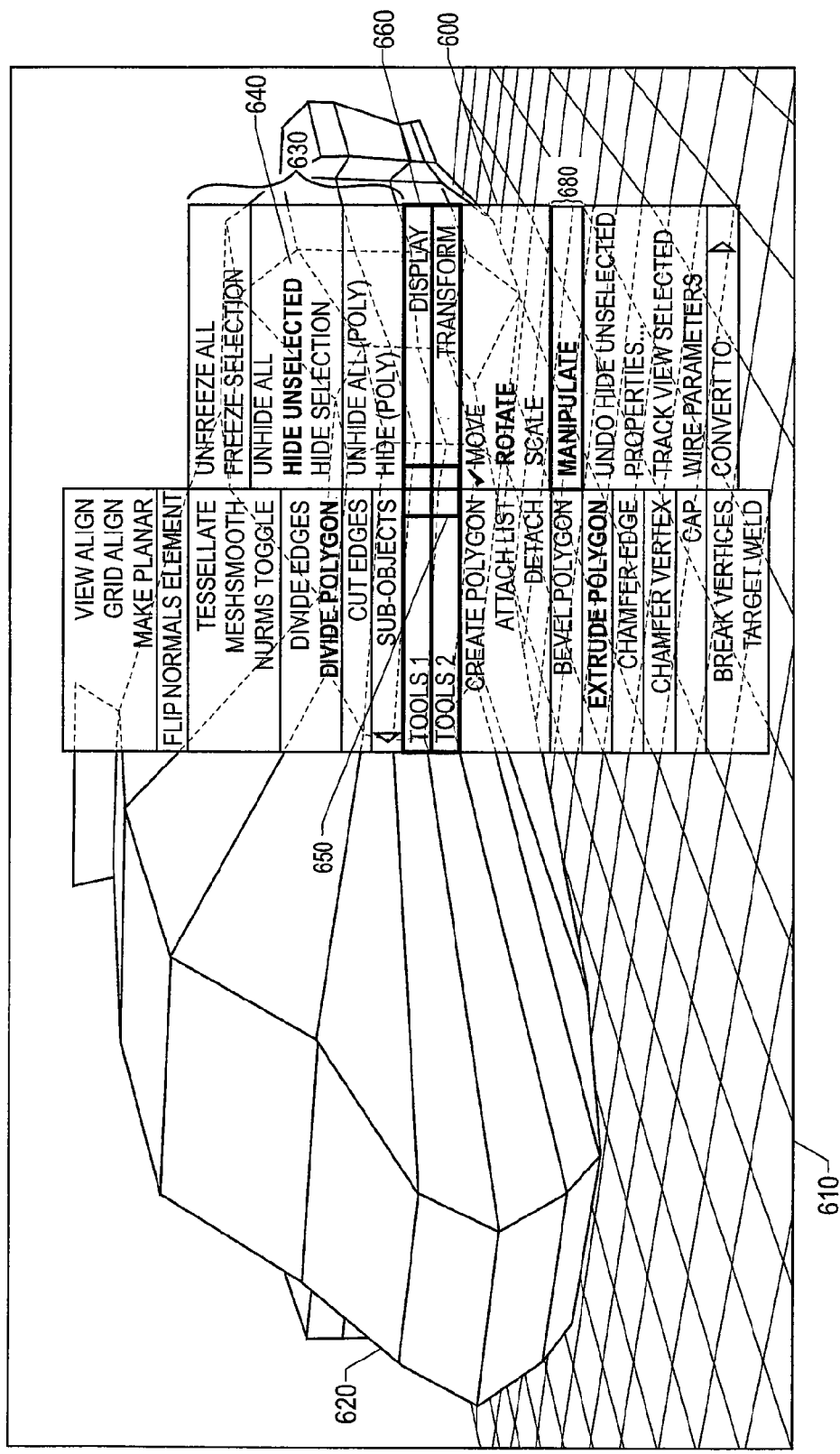
FIG. 6 is an illustration of a transparent multiple menu, according to one embodiment of the invention.

According to one embodiment, a multiple menu is transparent such that an image displayed on the display unit prior to displaying the multiple menu is still visible when the multiple menu is displayed over at least a portion of the image. FIG. 6 is an illustration of a transparent multiple menu, according to one embodiment of the invention. FIG. 6 depicts a transparent multiple menu 600 that is displayed on top of an image 610 that includes an object 620. By using transparent multiple menu 600 instead of a non-transparent multiple menu, image 610 and object 620 remain visible. Being able to still see the underlying image or object when a multiple menu is displayed may be desirable so that the user can continue to see on the image or object while determining which menu item to select.

In addition, multiple menus may incorporate the selection of highlighted menu items as discussed below.

VI. Selecting a Highlighted Menu Item

According to one embodiment, a user may select a highlighted menu item from a menu without selecting the highlighted menu item itself. For example, a menu may include a set of menu items, one of which is highlighted by being displayed in a different color, against a different colored background, or with a different border. Conventionally, the user would select a desired menu item by moving a cursor over the menu item and pressing a button on a mouse or other cursor control device, or by moving a selection bar up and down the menu using arrow keys. However, according to one embodiment, the user selects the highlighted menu item without having to perform these traditional approaches. For example, the user may instead select another graphical object, such as a selection region of a multiple menu or a title bar of the menu, which the application is configured to recognize as the selection of the highlighted menu item on the associated menu.

For example, in FIG. 6, a base menu 630 is illustrated that includes a highlighted menu item 640. Associated with base menu 630 are a selection region 650 and a menu title 660. To select highlighted menu item 640, the user may employ the traditional approaches of clicking on highlighted menu item 640 with a cursor or moving a highlighted selection bar 680 to highlighted menu item 640 and pressing the "ENTER" key on a keyboard.

However, according to this embodiment, highlighted menu item 640 may be selected by positioning a cursor over selection region 650 or menu title 660 and pressing a button on the cursor control device. In many implementations, the cursor is positioned at or near the selection region 650 or menu title 660 when the menu panel is initially displayed. Therefore, highlighted menu item 640 may be selected with little or no movement of the cursor, thus improving the user's efficiency in working with the menus of the application.

According to another embodiment, the highlighted menu item in a menu is selected by a variety of methods, including but not limited to, the user pressing one or more keys on an input device, the user pressing one or more keys on an input device in combination with pressing one or more buttons on a cursor control device, or by the user giving a voice command. More than one menu item may be highlighted in a particular menu, with selection of each item based on a particular command, key or keys, voice command, or a combination thereof.

The selection of a menu item to be highlighted in a menu may depend on a number of factors. For example, the menu may be configured to highlight a particular menu item as the default menu item for the menu. As another example, the menu may be configured to highlight the menu item that was last selected from the menu. As yet another example, the menu may be configured to highlight the menu item that has been selected most often for the menu, such as the menu item selected the most times out of a specified number of times that the menu was used (e.g., the most out of the last ten times the menu was used).

VII. Generating and Customizing Menus

According to one embodiment, menus are generated by creating a master menu that has all potential menu items and then applying a display filter that determines which menu items are to be displayed with the menu. For example, an edit master menu is created that includes some or all of the editing menu items for the application, and an edit menu display filter is applied to determine which of the edit menu items are to be displayed when the user requests the edit menu. The display filter may be implemented as a program that determines which menu items are to be displayed based on specified criteria.

For example, the program that implements the display filter may be configured to recognize what menu items are applicable to a particular context, and to determine what menu items apply to the context at the time the menu is requested. For example, a particular menu item may only apply to an editable mesh, and thus the criteria for displaying the particular menu item is that the selected object is an editable mesh. The program determines whether the criteria is satisfied, and if so, displays the menu item, and if not, does not display the menu item.

The criteria for determining whether a particular menu item is to be displayed may be stored with several entities, including but not limited to, the display filter, the menu item, additional stored data, or a combination thereof.

The approach of using a display filter allows for easy user customization of menus. For example, a user may edit the menu items for a menu and select which are to be displayed with the menu and which are not to be displayed. The user's selections may be stored in a data file associated with the menu, and the display filter retrieves the data file when generating a menu for display on a display unit. The data file may also contain information about other customization features, such as the organization of the menu items for a base menu, coloring options for the base menu, menu items, menu panel, and selection region, the width of the base menu, and positioning of the base menus and menu panel.

Figure 11:
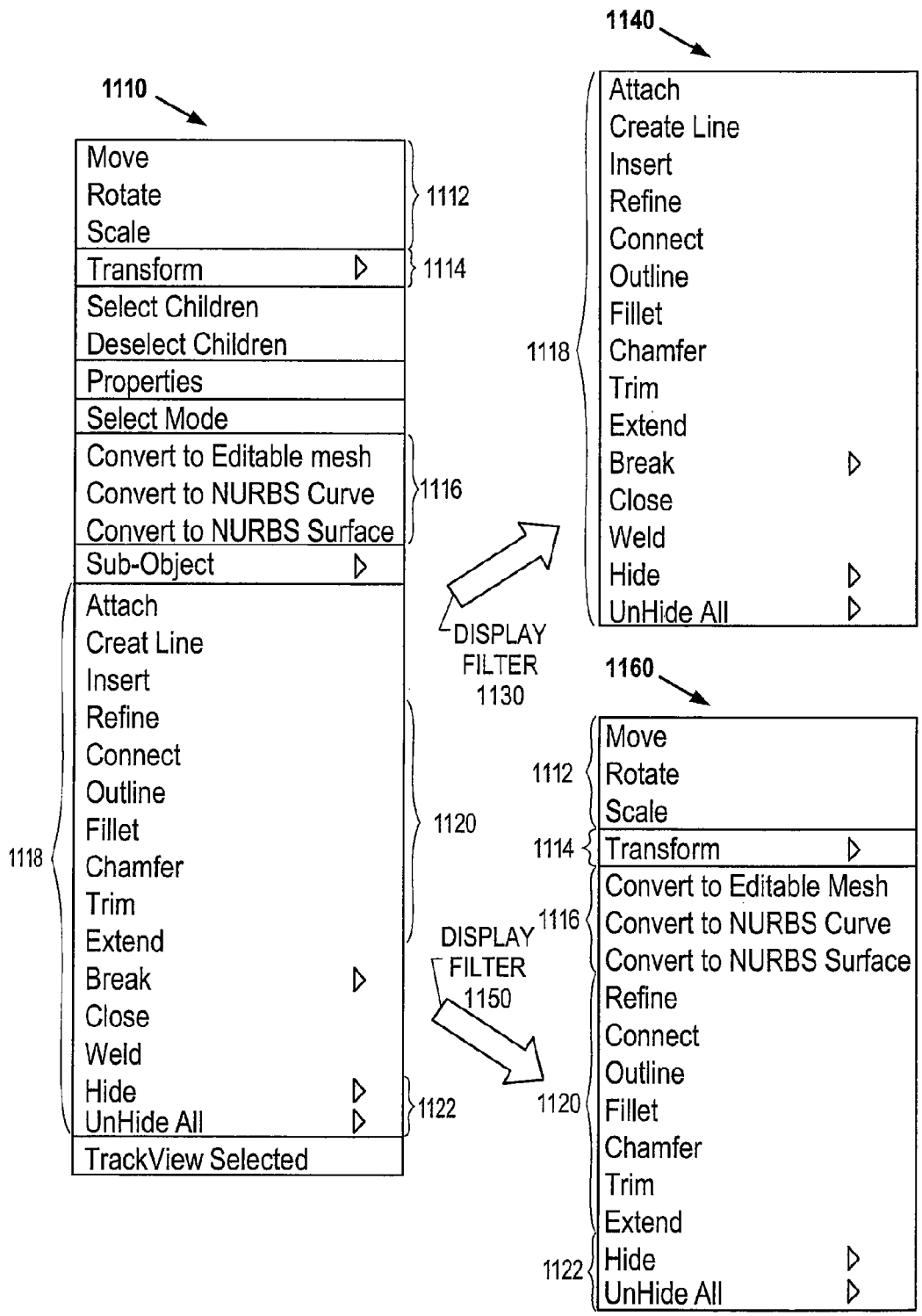
FIG. 11 is an illustration of an example of a master menu and two examples of filtered menus based on the example master menu, according to one embodiment of the invention.

FIG. 11 is an illustration of an example of a master menu and two examples of filtered menus based on the example master menu, according to one embodiment of the invention.

FIG. 11 depicts a master menu 1110 that includes a variety of menu items that relate to functions for manipulating objects in a graphics application. Included in the menu items are a set of basic object menu items 1112, a transform menu item 1114, a set of conversion menu items 1116, and a set of object tools 1118. Other menu items and sets of menu items besides those enumerated here may be included, such as those illustrated in master menu 1110. Set of object tools 1118 includes a variety of menu items, including a first subset of object tools 1120 and a second subset of object tools 1122. Other menu items and subsets of object tools for set of object tools 1118 may be included, such as those illustrated in set of object tools 1118.

FIG. 11 illustrates a first filtered menu 1140 that is generated by applying a display filter 1130 to master menu 1110. In this example, display filter 1130 is based on first filter data that is received from a user, such as by the method described in reference to FIG. 4. The first filter data that defines display filter 1130 specifies that only set of object tools 1118 be displayed from master menu 1110 when first filtered menu 1140 is displayed.

FIG. 11 illustrates a second filtered menu 1160 that is generated by applying a display filter 1150 to master menu 1110. In this example, display filter 1150 is based on second filter data that is received from a user, such as by the method described in reference to FIG. 4. The second filter data that defines display filter 1150 specifies that set of basic object menu items 1112, transform menu item 1114, set of conversion menu items 1116, first subset of object tools 1120 and second subset of object tools 1122 are to be displayed from master menu 1110 when second filtered menu 1160 is displayed.

According to one embodiment, master menu 1110 is configured by an application developer whereas display filters 1130, 1150 are based on first and second filter data, respectively, that are provided by end users. For example, first and second filter data may be supplied by different end users and may affect only the menu as displayed when each end user requests the filtered menu. As another example, first and second filter data may be supplied by the same end user at different times, such as if the end user defines display filter 1130 at a first time and then modifies the first display data to create the second display data to create display filter 1150. As another example, first and second filter data may be supplied by the same end user to define separate menus that may be available at the same time for access based on different commands from the end user.

According to another embodiment, other entities besides a developer may configure the master menu, and other entities may supply the filter data. For example, a user of the application may be provided with the capability to define a master menu. As another example, a developer of the application may supply filter data for a set of default menus based on the master menu.

Figure 7:
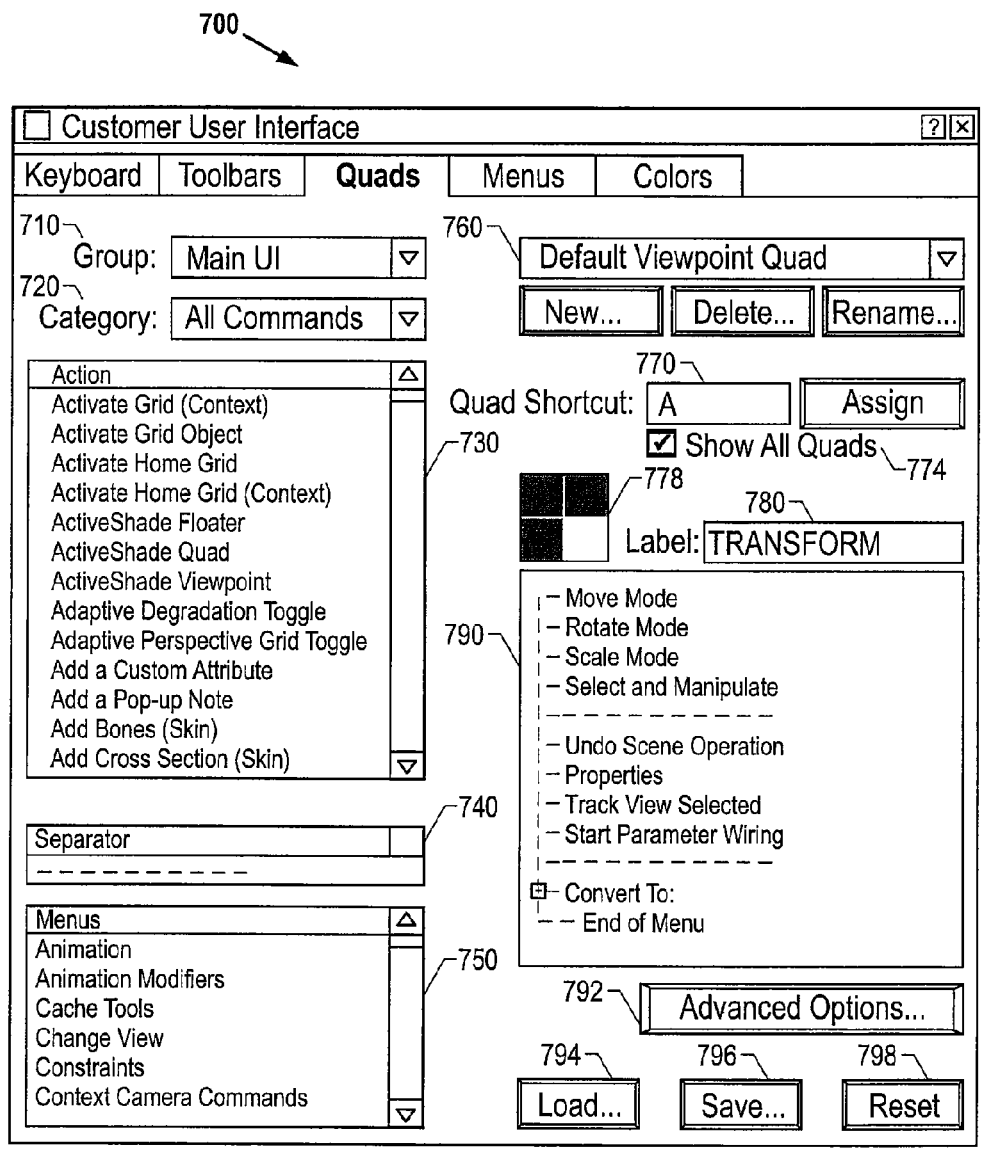
FIG. 7 is an illustration of user interface customization dialog box for multiple menus, according to one embodiment of the invention.

FIG. 7 is an illustration of user interface customization dialog box for multiple menus, according to one embodiment of the invention. Although FIG. 7 illustrates a multiple menu in the form of a quad menu with certain menu items and options that correspond to a 3D graphics application, other implementations are not limited to the quad menu format with the menu items and options for a 3D graphics application as illustrated in FIG. 7, nor are other implementations required to have all or any of the features illustrated in FIG. 7.

FIG. 7 depicts a dialog box 700 for customizing a quad menu that includes a variety of tools and objects for the user to provide input that may be used to supply filter data to define a display filter. Dialog box 700 includes a group object 710, a category object 720, a command list object 730, a separator object 740, a base menu type selection object 750, a quad menu selection object 760, a quad shortcut object 770, a "show all quads" object 774, a selection region selector object 778, a label object 780, a base menu object 790, an advanced options object 792, a load object 794, a save object 796, and a reset object 798.

The user specifies which group of the user interface that is to be customized using group object 710. As depicted in FIG. 7, the "Main U.I." group is selected.

The particular category of the selected group is specified using category object 720. As depicted in FIG. 7, the "All Commands" category for the "Main U.I." group is selected.

Command list object 730 lists the commands for the selected group and category.

The user specifies a separator between commands using separator object 740. As depicted in FIG. 7, a "_____" separator is specified.

Base menu type selection object 750 is used to specify which base menu is to be modified, and quad menu selection object 760 is used to specify which quad menu is to be modified. As depicted in FIG. 7, the "Default Viewport Quad" menu is selected in quad menu selection object 760.

Quad shortcut object 770 allows the user to specify a hot key or keys for the quad menu, and "show all quads" object 774 allows the user to specify whether or not all quads are to be displayed at the same time for selected quad menu.

Selection region selector object 778 allows the user to specify which selection region, and thereby which base menu, is to be modified.

Label object 780 allows the user to provide a label for the base menu associated with the desired selection region chosen via selection region selector object 778, which may be displayed as the menu title for the base menu.

Base menu object 790 allows the user to see the menu items, separators and organization of the particular base menu being modified.

Advanced options object 792 leads to a second dialog box as discussed below with reference to FIG. 8.

Load object 794 allows the user to load a previously saved customized multiple menu, save object 796 allows the user to save the current options for the selected multiple menu, and reset object 798 allows the user to reset the options for the selected multiple menu back to the previously saved set of options.

Figure 8:
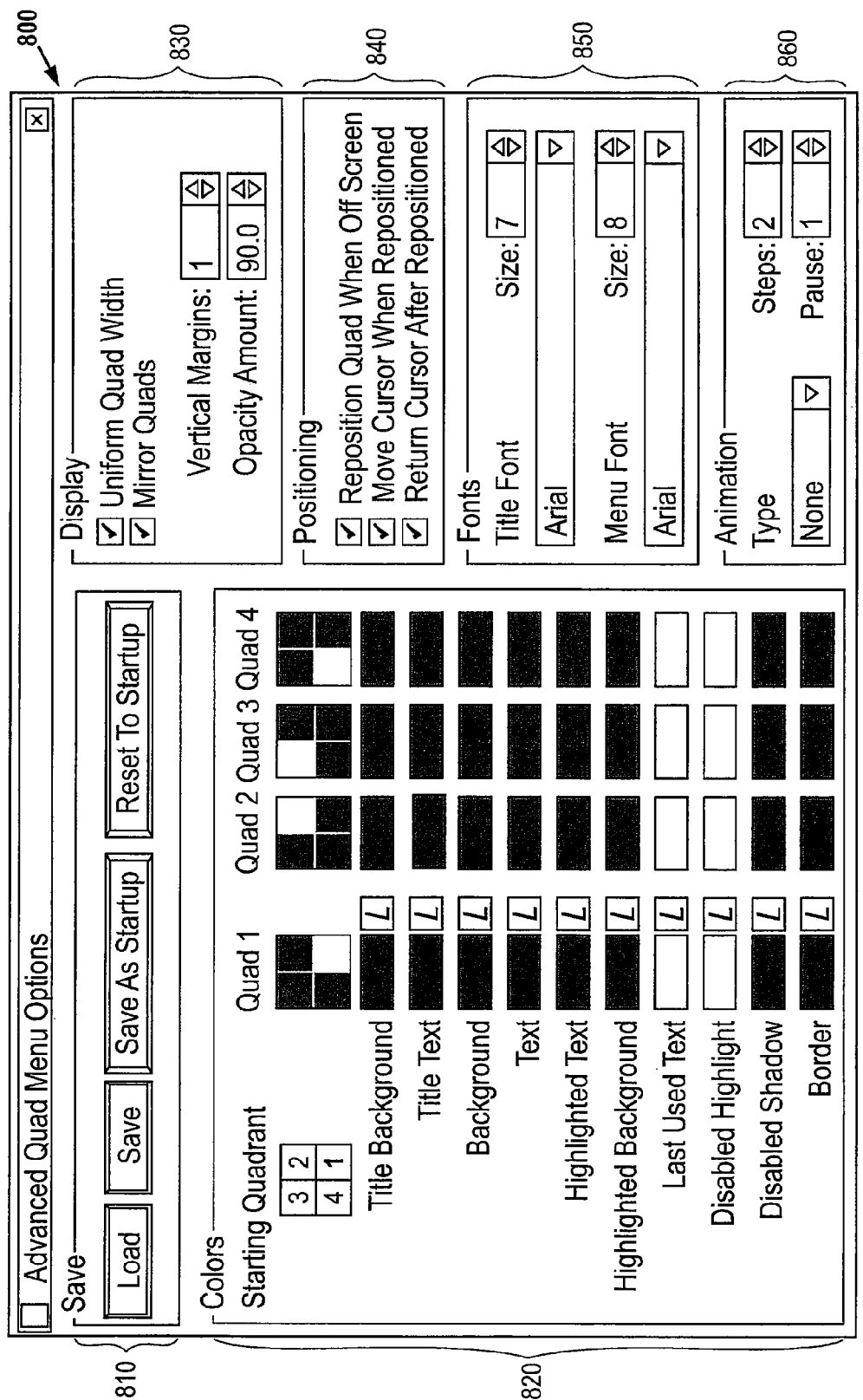
FIG. 8 is an illustration of an advanced quad menu options dialog box for multiple menus, according to one embodiment of the invention.

FIG. 8 is an illustration of an advanced quad menu options dialog box for multiple menus, according to one embodiment of the invention. Although FIG. 8 depicts a multiple menu in the form of a quad menu with certain menu items and options that correspond to a 3D graphics application, other implementations are not limited to the quad menu format with the menu items and options for a 3D graphics application as illustrated in FIG. 8, nor are other implementations required to have all or any of the features illustrated in FIG. 8.

FIG. 8 depicts a dialog box 800 for customizing the set of quad menus selected in dialog box 700 using advanced options that are not available in dialog box 700. Dialog box 800 includes a set of save options 810, a set of colors options 820, a set of display options 830, a set of positioning options 840, a set of fonts options 850, and a set of animation options 860.

Set of save options 810 allows the user to load a save set of options, save the current set of options, save the current options as the startup set of options, and reset the current multiple menu to the startup set of options.

Set of colors options 820 allows the user to customize the colors associated with each base menu that is associated with the selected multiple menu. Each base menu may be customized separately from the other base menus. For a particular base menu, the different colors used may be selected by the user, including but not limited to, the colors for the following: title background, title text, background, text, highlighted text, highlighted background, last used text, disabled highlight, disabled shadow and border.

Set of display options 830 allows the user to specify whether each base menu should have a uniform width, whether the base menus should be formatted to be "mirrors" of each other (e.g., justified towards the center of the set of base menus), the vertical margin for the base menus, and the opacity amount (e.g., to control the degree of transparency of the base menus).

Set of positioning options 840 allows the user to specify whether the base menu should be repositioned when off the screen, whether the cursor should be moved when a base menu is repositioned, and whether to return the cursor to the original position after the base menu is repositioned.

Set of fonts options 850 allows the user to specify the font style and font size for the menu title and the text of the menu. Set of animation options 860 allow the user to specify whether animation of the base menus is to be used, the type of animation, the steps to use in the animation, and the length of the pause between steps of the animation.

According to another embodiment, the requested menu panel and associated menus are not displayed in a separate window but rather as an image superimposed over the original image on the display unit. The original image over which the menu panel and associated menus are displayed is saved as a bit map for quick restoration when the menu panel and menus are no longer displayed.

VIII. Examples of Multiple Menus

FIGS. 9A-9B and FIGS. 10A-10B are illustrations of additional examples of multiple menus that feature one or more embodiments discussed above. Although the examples of FIGS. 9A-9B and FIGS. 10A-10B feature menu panels having square-shapes, the different types of variations illustrated in these figures may be applied to menu panels of other shapes, including but not limited to, the examples of menu panels illustrated in FIG. 5.

Figure 9A:
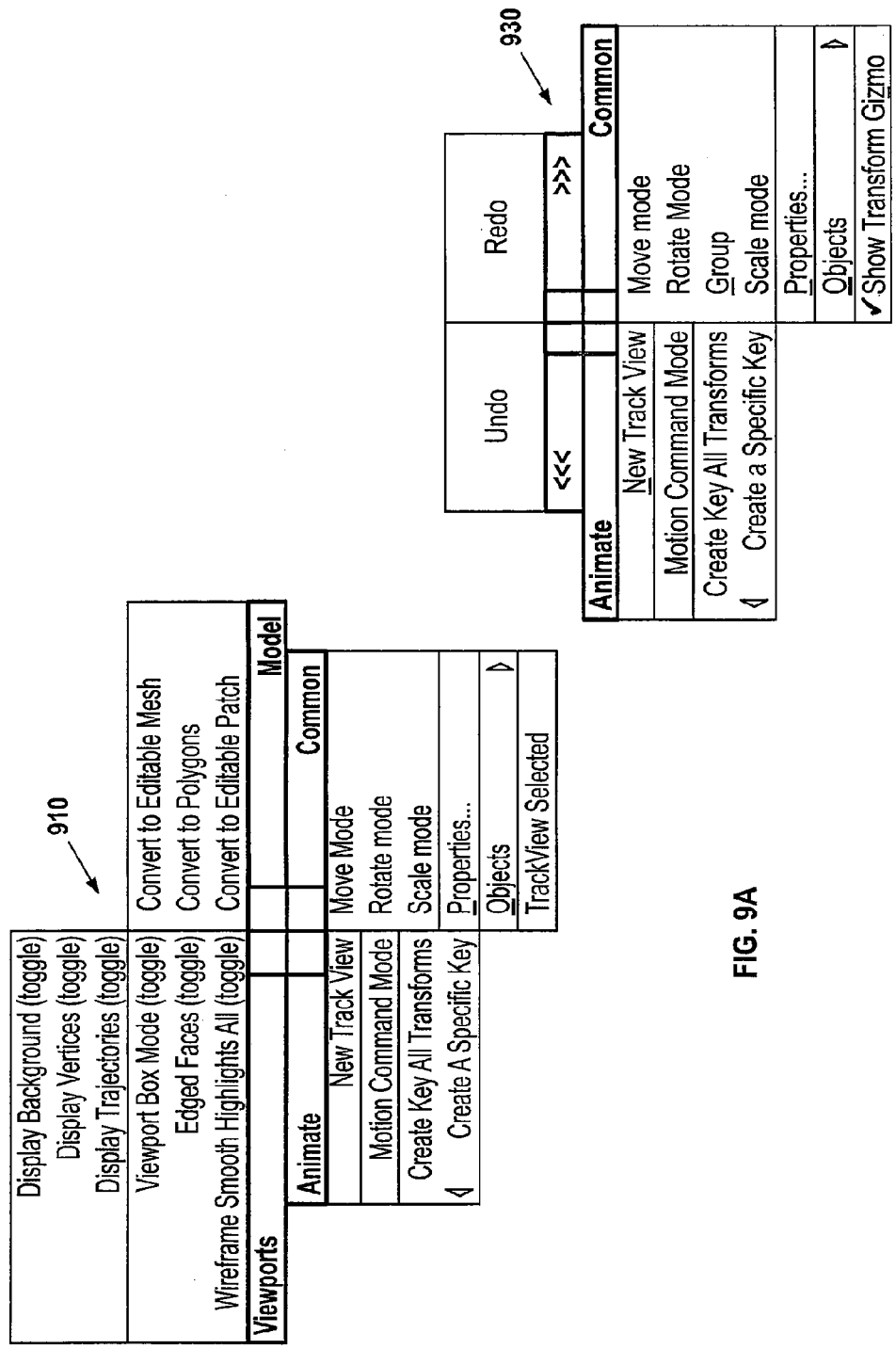
FIGS. 9A-9B and 10A-10B are illustrations of additional examples of multiple menus.

FIG. 9A depicts a multiple menu 910 having four base menus that are displayed simultaneously. Each of the base menus of multiple menu 910 includes several menu items, and a menu title is illustrated for each base menu. Multiple menu 910 also features mirror formatting with the menu items justified towards the vertical centerline and menu titles justified towards the outer edges. In addition, multiple menu 910 features solid single line separators between different groupings of the menu items for several of the base menus.

A multiple menu 930 has two base menus that contain different menu items and two base menus that are of the gesturing type. To select either the undo or redo menu item of the gesturing menus, the user moves the cursor from the menu panel towards the desired base menu and therefore does not need to click on the gesturing menu items, although a particular implementation may include having the user click on the gesturing menu items as well as the gesture of the cursor. Multiple menu 930 features menu titles of "<<<" and ">>>" for the gesturing base menus to denote them as being of the gesturing type, instead of as single menu item base menus that are not of the gesturing type.

A multiple gesturing menu 950 features multiple copies of the same menu item for each gesturing base menu. Also, multiple gesturing menu 950 features menu titles that correspond to the menu item for each gesturing menu, although menu titles of "<<<" and ">>>" or a different description or title may be used.

Figure 9B:
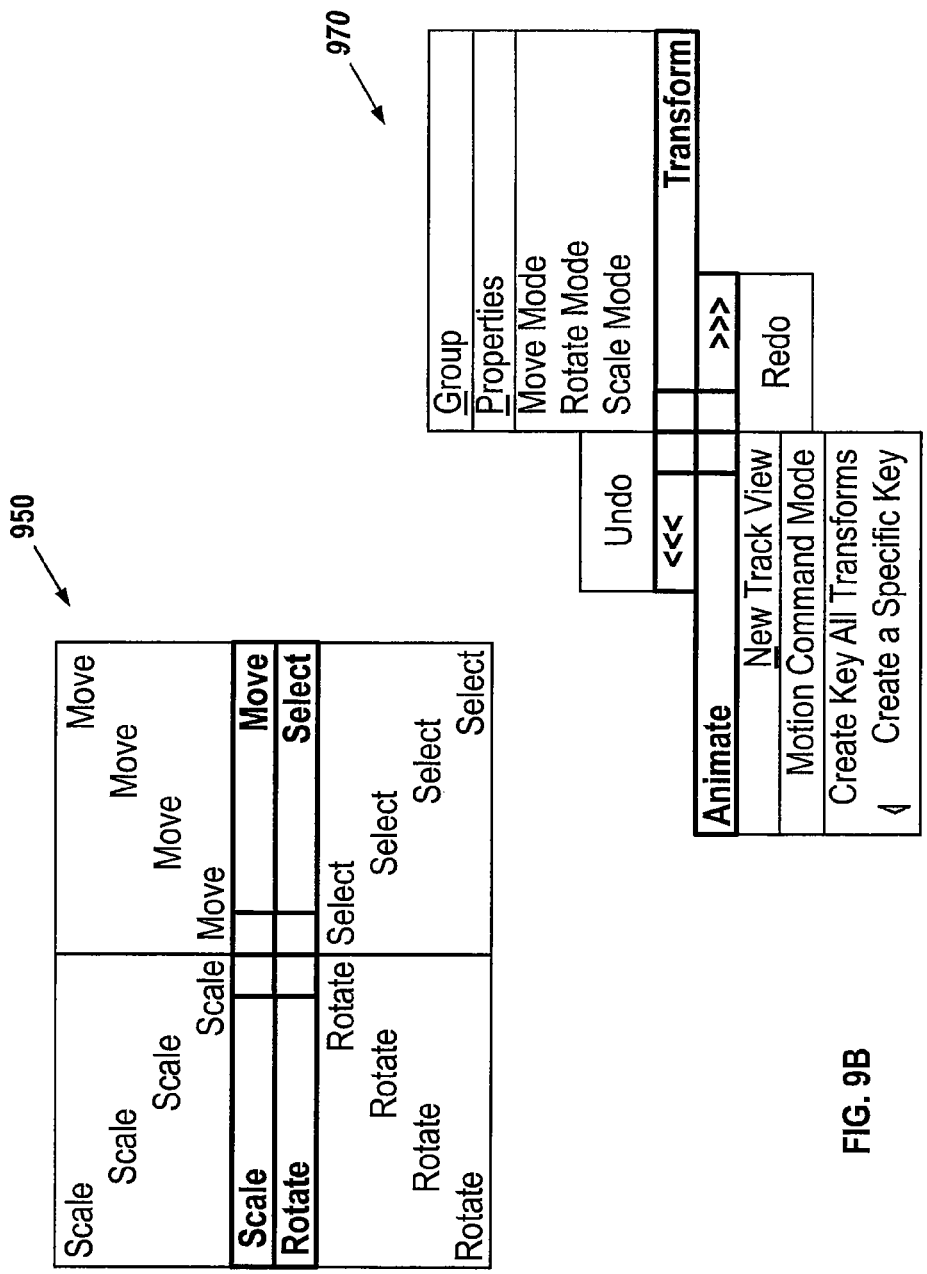

In addition, FIG. 9B depicts a multiple menu 970 that, similar to multiple menu 930, features two base menus that contain different menu items and two base menus that are of the gesturing type. However, multiple menu 970 is configured to have the gesturing menus in the upper left and lower right base menus whereas multiple menu 930 has the gesturing menus in the upper left and upper right base menus. In general, a multiple menu may have from no gesturing menus to all gesturing menus, and the gesturing menus may be located at any base menu position.

Figure 10A:
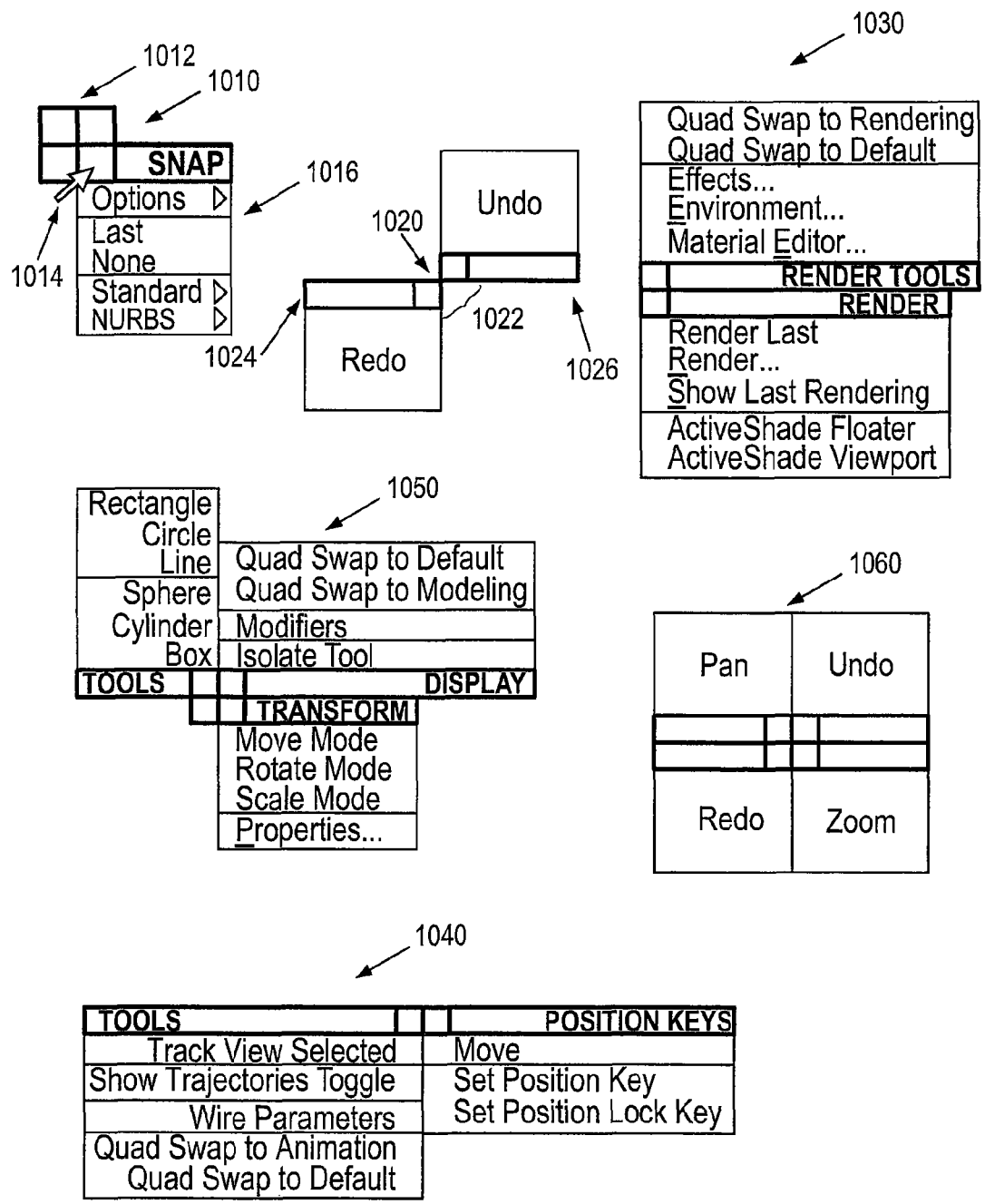

FIG. 10A depicts a multiple menu 1010 that includes a menu panel 1012. Unlike the other examples above, multiple menu 1010 displays only one base menu at a time, depending on the location of a cursor 1014. As illustrated in FIG. 10A, cursor 1014 is pointed at the lower right selection region of menu panel 1012, and therefore only a lower right base menu 1016 is displayed. As cursor 1014 is moved around menu panel 1012 to other selection regions, the base menus corresponding to the other selection regions are displayed.

A multiple gesturing menu 1020 includes a menu panel 1022 comprised of two selection regions that are positioned diagonally opposite of each other, with the associated base menus displayed diagonally opposite of each other as well. Multiple gesturing menu 1020 includes menu titles 1024, 1026, although menu titles 1024, 1026 are blank.

In addition, FIG. 10A includes two examples of multiple menus having two selection regions and two base menus: a multiple menu 1030 that has the two base menus arranged vertically and to the right of the menu panel, and a multiple menu 1040 that has the two base menus arranged horizontally and below the menu panel. However, in other implementations, the base menus may be arranged vertically and to the left of the menu panel, horizontally and above the menu panel, or diagonally as with multiple gesturing menu 1020.

A multiple menu 1050 is comprised of a square-shaped menu panel having only three selection regions instead of the typical four of the other examples. In other implementations, the three base menus illustrated for a three selection region square-shaped menu panel may occupy any three of the four corners of the full square-shaped menu panel.

Figure 10B:
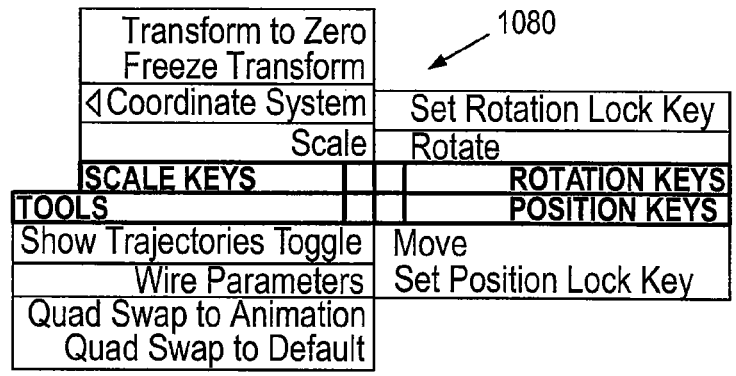
Figure 10B:
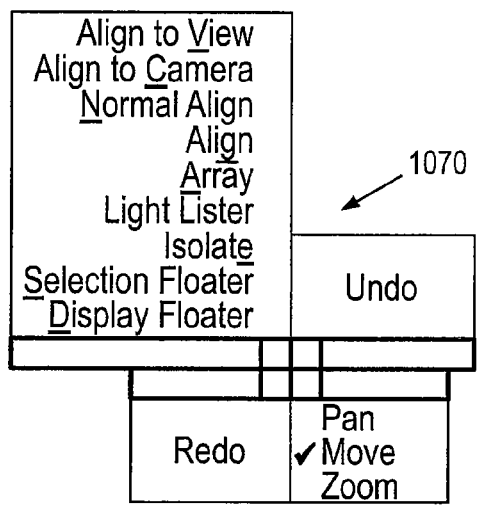

In addition, a multiple menu 1060 includes one menu item for each base menu and the base menus having uniform widths and heights. The base menus of multiple menu 1060 may be gesturing menus, single item non-gesturing menus, or a combination thereof. In FIG. 10B, a multiple menu 1070 is comprised of both gesturing and non-gesturing base menus in which the associated menu titles are blank, and a multiple menu 1080 that is comprised of four base menus of varying widths and heights.

IX. Hardware Overview

Figure 12:
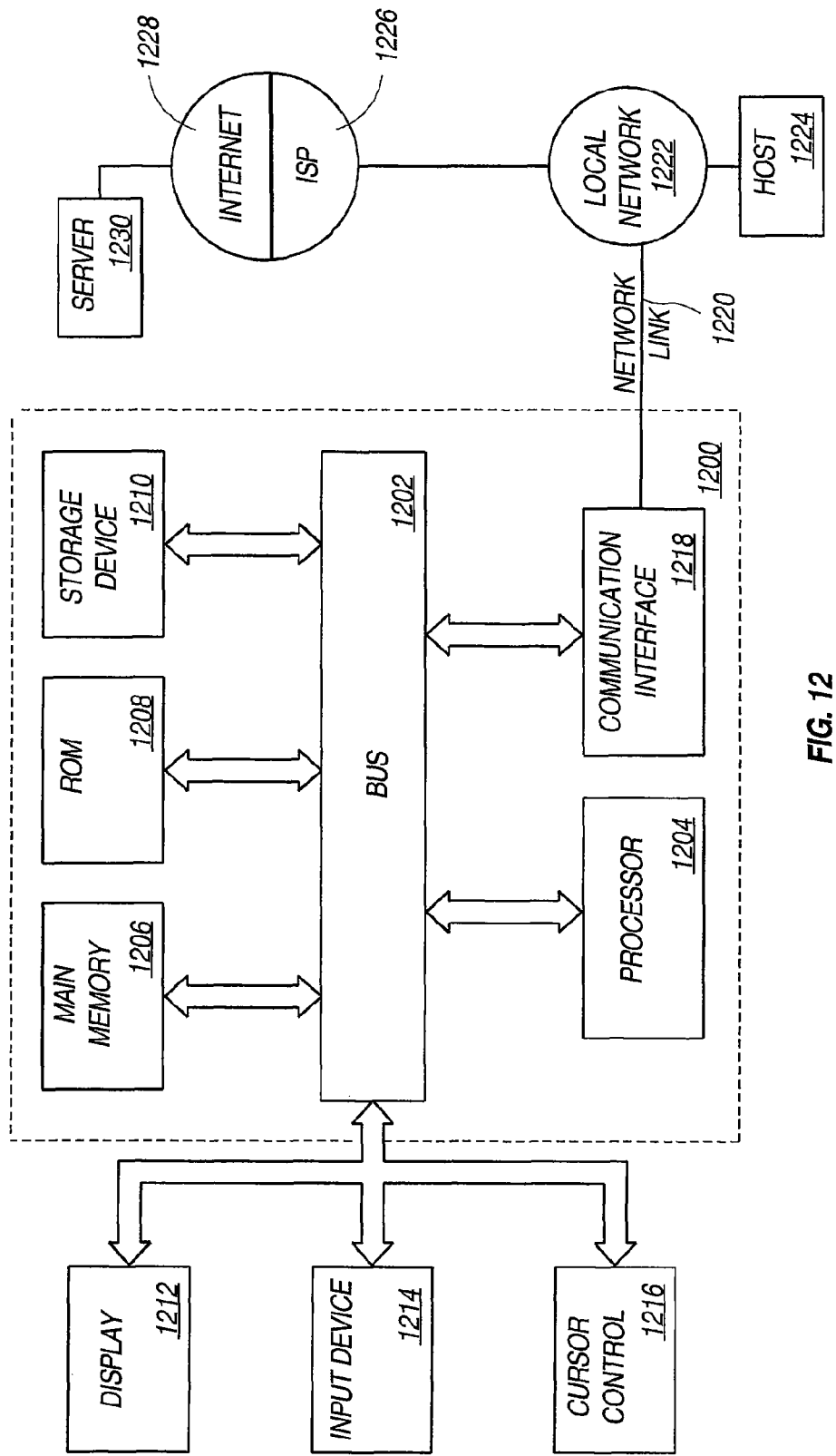
FIG. 12 is a block diagram that illustrates a computer system upon which an embodiment may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for allowing a user to select a particular menu item, the method comprising:
  receiving a request from the user for a menu panel, wherein:
    the request is not associated with the user selecting any menu objects that are displayed on a display unit at the time of the request;
    the menu panel containing a vertex oriented in relation to a cursor;
    the menu panel comprises two or more selection regions adjacent to the vertex; and
    each of the two or more selection regions is associated with a different base menu, wherein each base menu includes a plurality of menu items and is identified by a menu title, and wherein none of the base menus can be accessed from another menu;

displaying at least a first of the base menus to the user based upon the location of the cursor with respect to the vertex, wherein one menu item from among the plurality of menu items is highlighted to differentiate the one menu item from the other menu items of the plurality of menu items;

while displaying the at least first base menu to the user, receiving input from the user, wherein the input indicates that the user wants to select the one menu item, and wherein the input from the user is not received in response to the user selecting the menu item that is highlighted in the display of the at least first base menu and does not cause the menu title to change; and causing the one menu item to be executed.

2. The method of claim 1, wherein the one menu item was selected when the user last selected the one menu item from among the plurality of menu items from the menu prior to the request for the menu.

3. The method of claim 1, wherein the one menu item is specified as a default menu item for the menu.

4. The method of claim 1, wherein the input from the user is received in response to the user selecting a menu title that is displayed in association with the base menu.

5. A non-transitory computer-readable medium carrying one or more sequences of instructions for allowing a user to select a particular menu item, wherein execution of the one or more sequences of instructions by one or more processors causes the one or more processors to perform the steps of:

receiving a request from the user for a menu panel, wherein:
  the request is not associated with the user selecting any menu objects that are displayed on a display unit at the time of the request;
  the menu panel containing a vertex oriented in relation to a cursor;
  the menu panel comprises two or more selection regions adjacent to the vertex; and
  each of the two or more selection regions is associated with a different base menu, wherein each base menu includes a plurality of menu items and is identified by a menu title, and wherein none of the base menus can be accessed from another menu;

displaying at least a first of the base menus to the user based upon the location of the cursor with respect to the vertex, wherein one menu item from among the plurality of menu items is highlighted to differentiate the one menu item from the other menu items of the plurality of menu items;

while displaying the at least first base menu to the user, receiving input from the user, wherein the input indicates that the user wants to select the one menu item, and wherein the input from the user is not received in response to the user selecting the menu item that is highlighted in the display of the at least first base menu and does not cause the menu title to change; and causing the one menu item to be executed.

6. The medium of claim 5, wherein the one menu item was selected when the user last selected the one menu item from among the plurality of menu items from the menu prior to the request for the menu.

7. The medium of claim 5, wherein the one menu item is specified as a default menu item for the menu.

8. The medium of claim 5, wherein the input from the user is received in response to the user selecting a menu title that is displayed in association with the menu.

9. The method of claim 1, wherein the one menu item from among the plurality of menu items that is highlighted to differentiate the one menu item from the other menu items of the plurality of menu items is highlighted prior to the selection of the one menu item by the user.

10. The method of claim 1, wherein the input from the user indicating that the user wants to select the one menu item comprises selecting a menu title or selecting a selection region where the user requested the menu.

11. The method of claim 1, wherein:
wherein the one menu item from among the plurality of menu items that is highlighted to differentiate the one menu item from the other menu items of the plurality of menu items is highlighted prior to the selection of the one menu item by the user; and
the input from the user indicating that the user wants to select the one menu item comprises selecting a menu title or selecting a selection region where the user requested the menu.

12. The medium of claim 5, wherein the one menu item from among the plurality of menu items that is highlighted to differentiate the one menu item from the other menu items of the plurality of menu items is highlighted prior to the selection of the one menu item by the user.

13. The medium of claim 5, wherein the input from the user indicating that the user wants to select the one menu item comprises selecting a menu title or selecting a selection region where the user requested the menu.

14. The medium of claim 5, wherein:
wherein the one menu item from among the plurality of menu items that is highlighted to differentiate the one menu item from the other menu items of the plurality of menu items is highlighted prior to the selection of the one menu item by the user; and
the input from the user indicating that the user wants to select the one menu item comprises selecting a menu title or selecting a selection region where the user requested the menu.

15. The medium of claim 9, wherein the one menu item from among the plurality of menu items that is highlighted to differentiate the one menu item from the other menu items of the plurality of menu items is highlighted based on the one menu item most often selected by the user.

16. The method of claim 12, wherein the one menu item from among the plurality of menu items that is highlighted to differentiate the one menu item from the other menu items of the plurality of menu items is highlighted based on the one menu item most often selected by the user.

17. The method of claim 1, wherein the menu titles are adjacent to the menu panel and the selection regions, and the menu tittles are associated with the base menus; and wherein the input from the user indicating that the user wants to select the one menu item comprises selecting the menu title or the selection region.

18. The method of claim 1, wherein the menu panel is displayed with at least a first base menu displayed, and the first base menu associated with the selection region closest to the cursor.

19. The medium of claim 5, wherein the menu titles are adjacent to the menu panel and the selection regions, and the menu tittles are associated with the base menus; and wherein the input from the user indicating that the user wants to select the one menu item comprises selecting the menu title or the selection region.

20. The medium of claim 5, wherein the menu panel is displayed with at least a first base menu displayed, and the first base menu associated with the selection region closest to the cursor.

21. The medium of claim 5, wherein the menu panel is triangularly shaped, and the two or more selection regions are defined by lines between a center of a triangle and a center point of at least one of the sides of the triangle.

* * * * *

UNITED STATES PATENT AND TRADEMARK OFFICE
CERTIFICATE OF CORRECTION

Page 1 of 1

PATENT NO. : 9,081,480 B2
APPLICATION NO. : 11/773207
DATED : July 14, 2015
INVENTOR(S) : Britt S. Miura and Scott C. Morrison It is certified that error appears in the above-identified patent and that said Letters Patent is hereby corrected as shown below:

IN THE CLAIMS

Column 26, Claim 17, Line 50, please change "tittles" to --titles--.

Signed and Sealed this
First Day of March, 2016

Michelle K. Lee
*Director of the United States Patent and Trademark Office*